United States Patent
Malladi et al.

(10) Patent No.: US 9,306,795 B2
(45) Date of Patent: *Apr. 5, 2016

(54) MULTIPLEXING AND TRANSMISSION OF TRAFFIC DATA AND CONTROL INFORMATION IN A WIRELESS COMMUNICATION SYSTEM

(71) Applicant: QUALCOMM Incorporated, San Diego, CA (US)

(72) Inventors: Durga Prasad Malladi, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/897,714

(22) Filed: May 20, 2013

(65) Prior Publication Data

US 2013/0250895 A1   Sep. 26, 2013

Related U.S. Application Data

(63) Continuation of application No. 12/185,597, filed on Aug. 4, 2008, now Pat. No. 8,467,367.

(60) Provisional application No. 60/954,299, filed on Aug. 6, 2007.

(51) Int. Cl.
*H04W 4/00* (2009.01)
*H04L 29/06* (2006.01)
(Continued)

(52) U.S. Cl.
CPC ........ *H04L 29/06183* (2013.01); *H04L 1/0003* (2013.01); *H04L 1/0004* (2013.01);
(Continued)

(58) Field of Classification Search
None
See application file for complete search history.

(56) References Cited

U.S. PATENT DOCUMENTS 6,101,168 A   8/2000   Chen et al.
6,363,058 B1  3/2002   Roobol et al.
(Continued)

FOREIGN PATENT DOCUMENTS

CN   1379558 A   11/2002
CN   1788446 A    6/2006
(Continued)

OTHER PUBLICATIONS

Alcatel-Lucent, Status of stage 3 "Services provided by the physical layer" specification, 3GPP TSG RAN WG2#58, Document #R2-072502, pp. 1-36, Jun. 25-29, 2007.
(Continued)

*Primary Examiner* — Michael J Moore, Jr.
(74) *Attorney, Agent, or Firm* — Peng Zhu

(57) ABSTRACT

Techniques for transmitting traffic data and control information in a wireless communication system are described. In an aspect, traffic data and control information may be multiplexed at a coded data level. A user equipment (UE) may encode traffic data to obtain coded traffic data, encode control information to obtain coded control data, multiplex the coded traffic data and the coded control data, modulate the multiplexed data, and generate SC-FDMA symbols. In another aspect, traffic data and control information may be multiplexed at a modulation symbol level. The UE may encode and modulate traffic data to obtain data modulation symbols, encode and modulate control information to obtain control modulation symbols, multiplex the data and control modulation symbols, and generate SC-FDMA symbols. The UE may perform rate matching for traffic data to account for control information. The UE may also perform multiplexing and puncturing for different types of control information.

102 Claims, 12 Drawing Sheets

(51) Int. Cl.
*H04L 1/00* (2006.01)
*H04L 1/16* (2006.01)
*H04L 5/00* (2006.01)
*H04L 25/03* (2006.01)

(52) U.S. Cl.
CPC ............ *H04L1/0005* (2013.01); *H04L 1/0013* (2013.01); *H04L 1/0068* (2013.01); *H04L 1/0072* (2013.01); *H04L 1/1664* (2013.01); *H04L 5/0044* (2013.01); *H04L 5/0053* (2013.01); *H04L 5/0091* (2013.01); *H04L 1/0078* (2013.01); *H04L 1/1607* (2013.01); *H04L 5/0007* (2013.01); *H04L 5/0064* (2013.01); *H04L 25/03866* (2013.01)

(56) References Cited

U.S. PATENT DOCUMENTS

| | | | |
|---|---|---|---|
| 6,735,180 | B1 | 5/2004 | Malkamaki et al. |
| 7,133,354 | B2 | 11/2006 | Laroia et al. |
| 7,260,366 | B2 | 8/2007 | Lee et al. |
| 7,796,562 | B2 | 9/2010 | Sung |
| 7,881,247 | B2 | 2/2011 | Pan et al. |
| 8,448,053 | B2 * | 5/2013 | Landau et al. ................ 714/790 |
| 8,467,367 | B2 | 6/2013 | Malladi et al. |
| 8,630,368 | B2 * | 1/2014 | Nishio et al. ................ 375/295 |
| 2002/0149496 | A1 | 10/2002 | Dabak et al. |
| 2005/0186983 | A1 | 8/2005 | Iochi |
| 2005/0197065 | A1 | 9/2005 | Tamaki et al. |
| 2005/0208973 | A1 | 9/2005 | Iochi |
| 2007/0014272 | A1 | 1/2007 | Palanki et al. |
| 2007/0038912 | A1 | 2/2007 | Hashimoto et al. |
| 2007/0097927 | A1 * | 5/2007 | Gorokhov et al. ............ 370/335 |
| 2007/0171995 | A1 | 7/2007 | Muharemovic et al. |
| 2007/0183386 | A1 | 8/2007 | Muharemovic et al. |
| 2007/0211656 | A1 | 9/2007 | Kwak et al. |
| 2008/0298477 | A1 | 12/2008 | Classon |
| 2008/0304467 | A1 | 12/2008 | Papasakellariou et al. |
| 2009/0022135 | A1 | 1/2009 | Papasakellariou et al. |
| 2009/0044082 | A1 * | 2/2009 | Landau et al. ................ 714/790 |
| 2009/0196165 | A1 | 8/2009 | Morimoto et al. |
| 2010/0172286 | A1 | 7/2010 | Yoshii et al. |

FOREIGN PATENT DOCUMENTS

| | | |
|---|---|---|
| EP | 1806867 A2 | 7/2007 |
| FR | 2867344 A1 | 9/2005 |
| FR | 2869189 A1 | 10/2005 |
| JP | 2004173017 A | 6/2004 |
| JP | 2004173019 A | 6/2004 |
| JP | 2007096494 A | 4/2007 |
| RU | 2242089 C2 | 12/2004 |
| WO | 9901994 | 1/1999 |
| WO | 2006099473 A2 | 9/2006 |
| WO | 2006138206 A1 | 12/2006 |
| WO | WO-2007019555 | 2/2007 |
| WO | 2007078146 A1 | 7/2007 |
| WO | WO-2007078177 | 7/2007 |
| WO | 2007087602 A2 | 8/2007 |
| WO | 2008114510 A1 | 9/2008 |

OTHER PUBLICATIONS

International Search Report and Written Opinion—PCT/US2008/072254, International Search Authority—European Patent Office—Dec. 3, 2008.
NTT DoCoMo, et al., "Multiplexing Method of Shared Control Channel in Uplink Single-Carrier FDMA Radio Access," TSG RAN WG1 #42bis, Document #R1-051143 (Original R1-050591), pp. 1-9, XP002450609, Oct. 10-14, 2005.
Samsung, "Data and Control Channel Multiplexing in SC-FDMA for EUTRA Uplink," 3GPP TSG RAN WG1 Meeting #43, Document #R1-051343, Seoul, Korea, XP002450962, Nov. 7-11, 2005.
Taiwan Search Report—TW097129967—TIPO—Jun. 12, 2012.
Alcatel-Lucent, "Multiplexing Method for Uplink Non-Data-Associated Control Signals",3GPP TSG-RAN WG1 #48bis, Mar. 30, 2007, pp. 1/6-6/6, R1-071719.
Samsung: "PUCCH Transmission without Data in E-UTRA", 3GPP TSG-RAN WG1# 49bis, Jun. 20, 2007, pp. 1-5, R1-073093, URL, http://www.3gpp.org/ftp/tsg_ran/WG1_RL1/TSGR1_49b/Docs/R1-073093.zip.
Teliasonera: "PUCCH and the UE SEM", 3GPP TSG-RAN WG4#43bis, Jun. 25, 2007, 6 Pages, R4-071074,URL, http://www.3gpp.org/flp/tsg_ran/WG4_Radio/TSGR4_43bis/Docs/R4-071074.zip.

* cited by examiner

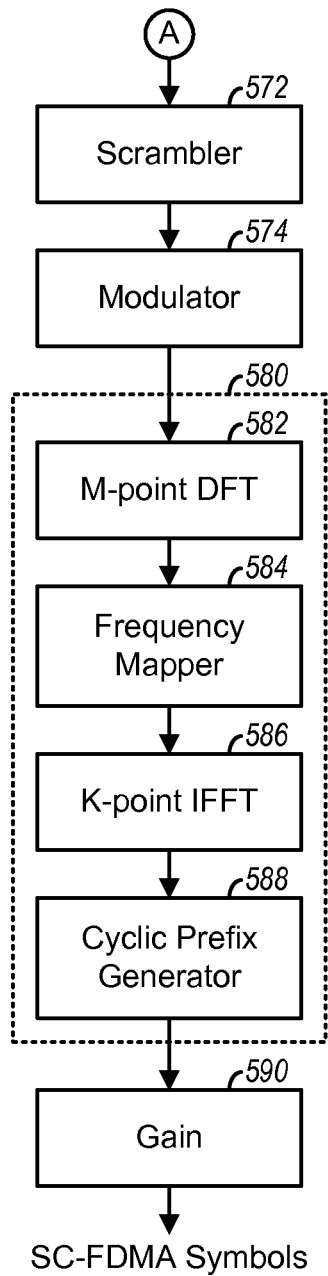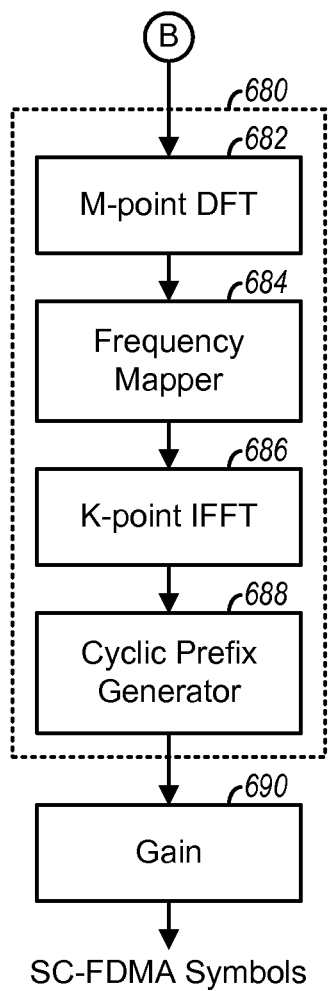
FIG. 5B
FIG. 6B

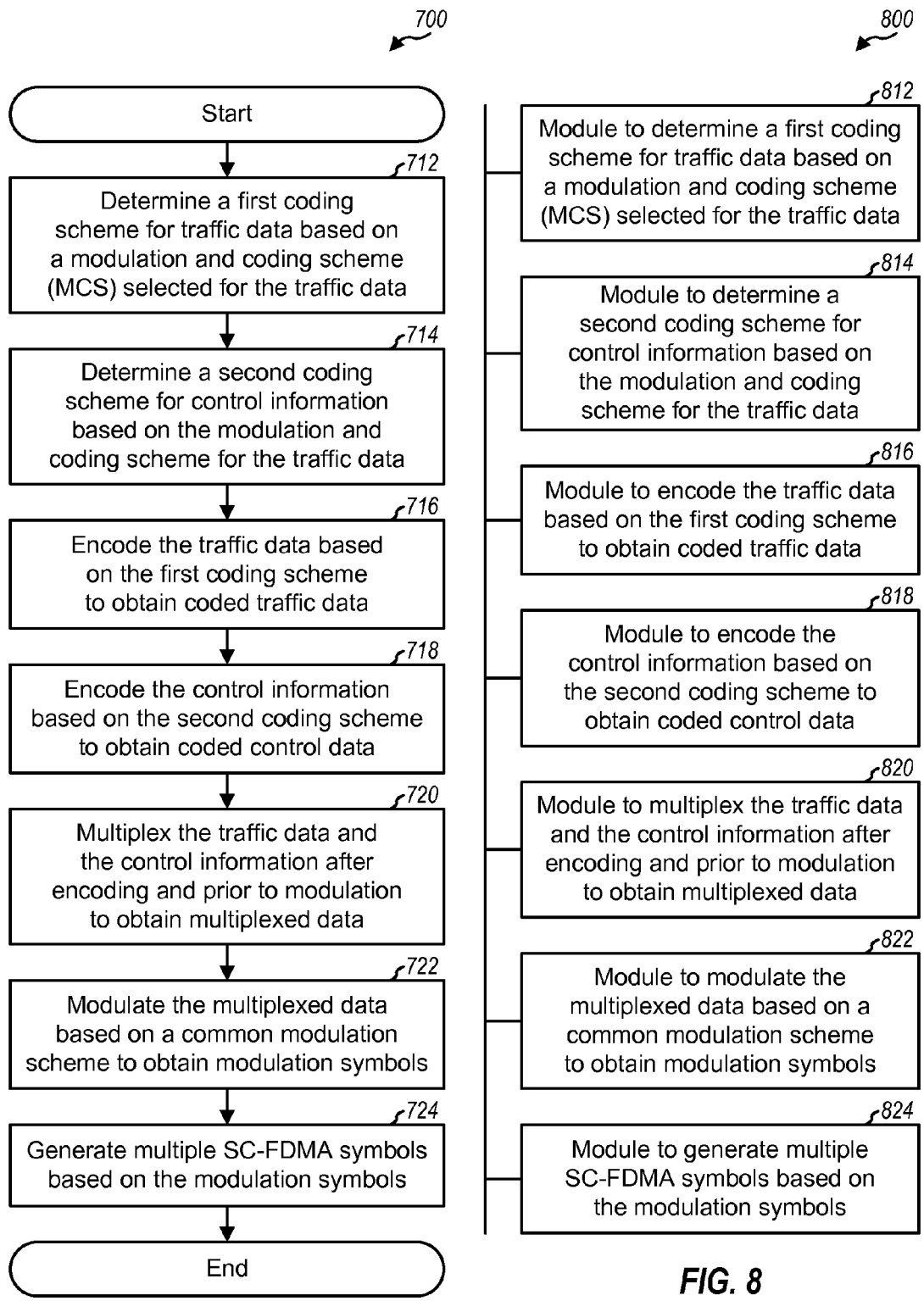

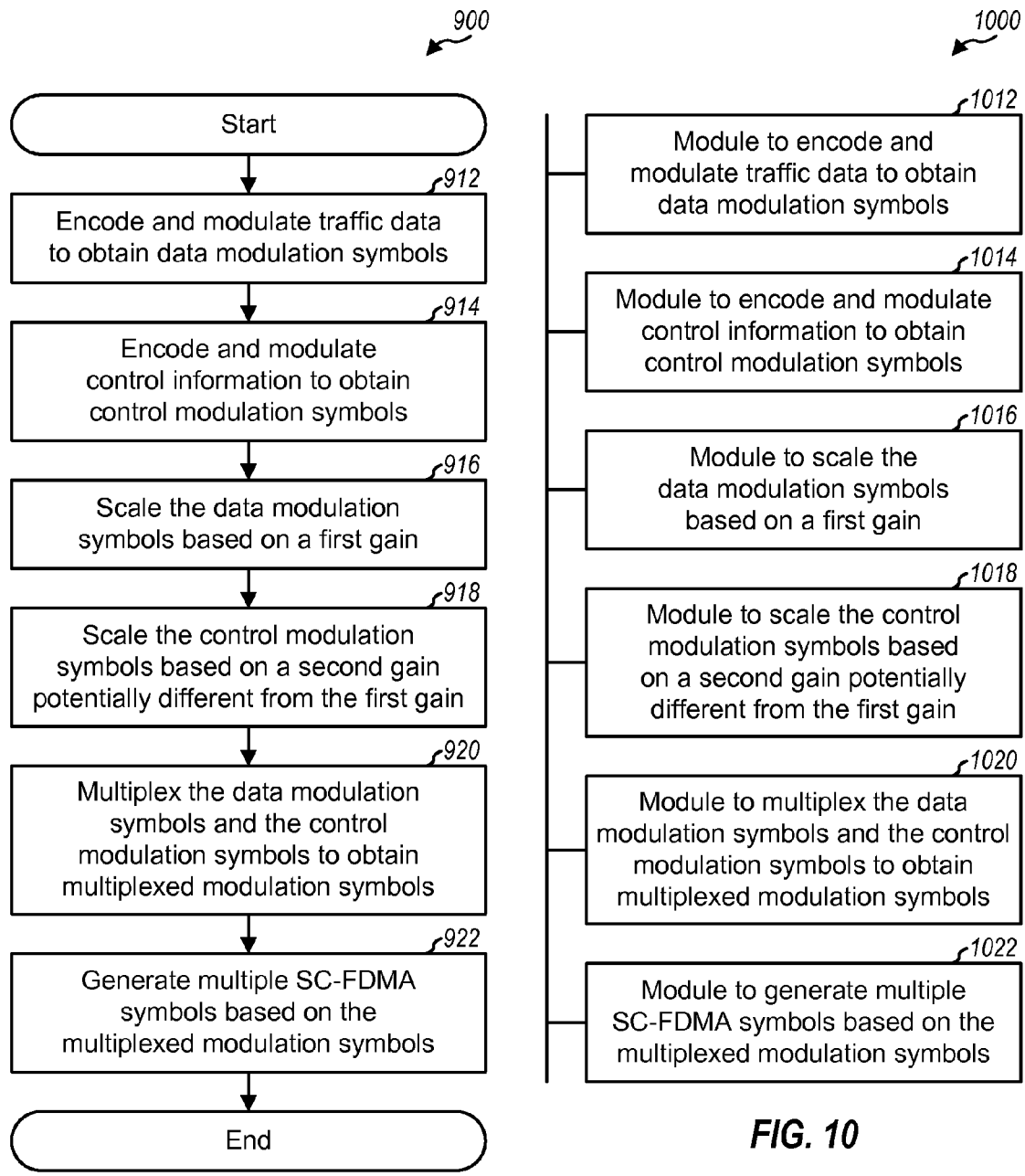

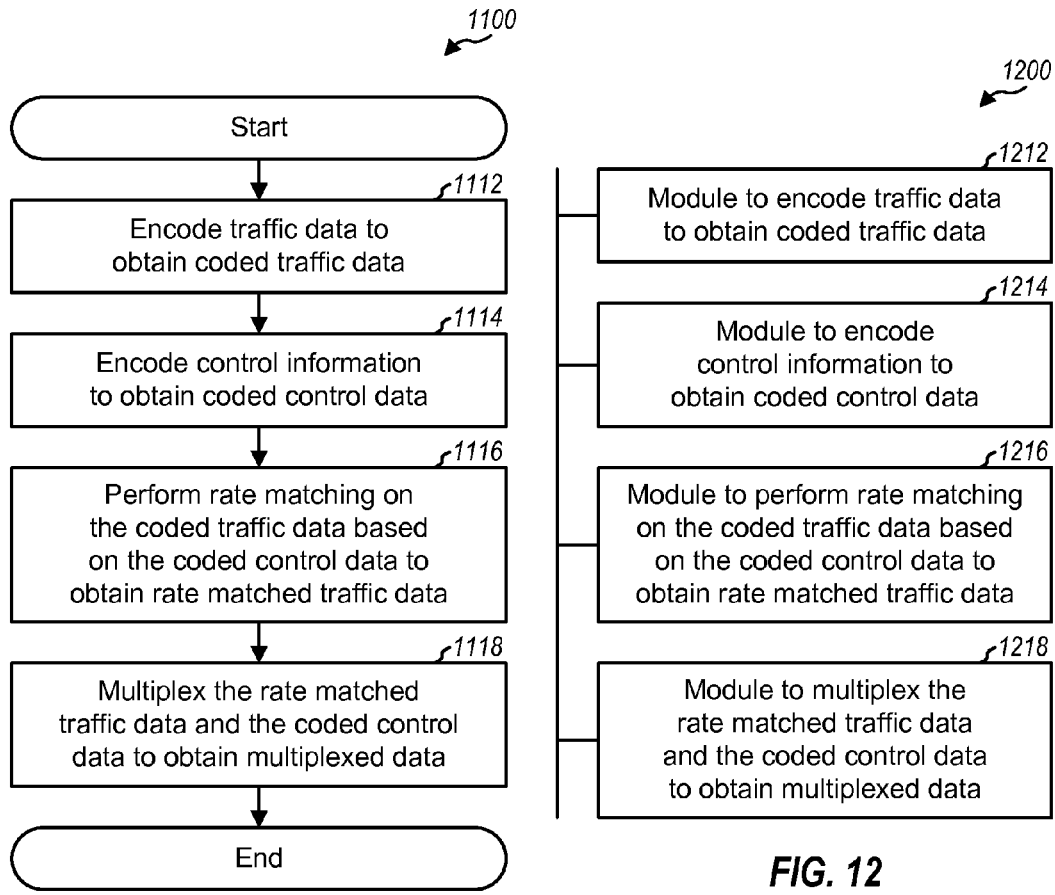
FIG. 11
FIG. 12
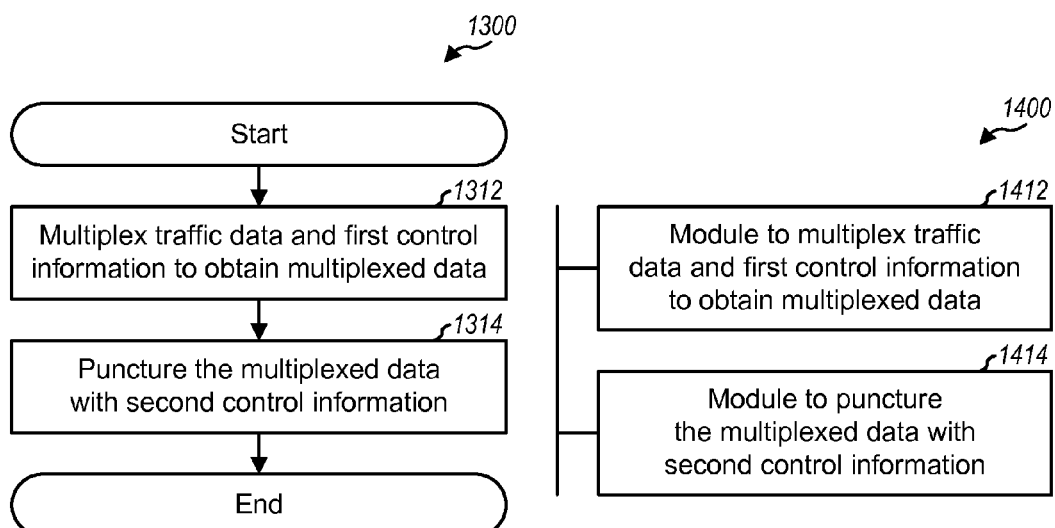
FIG. 13
FIG. 14

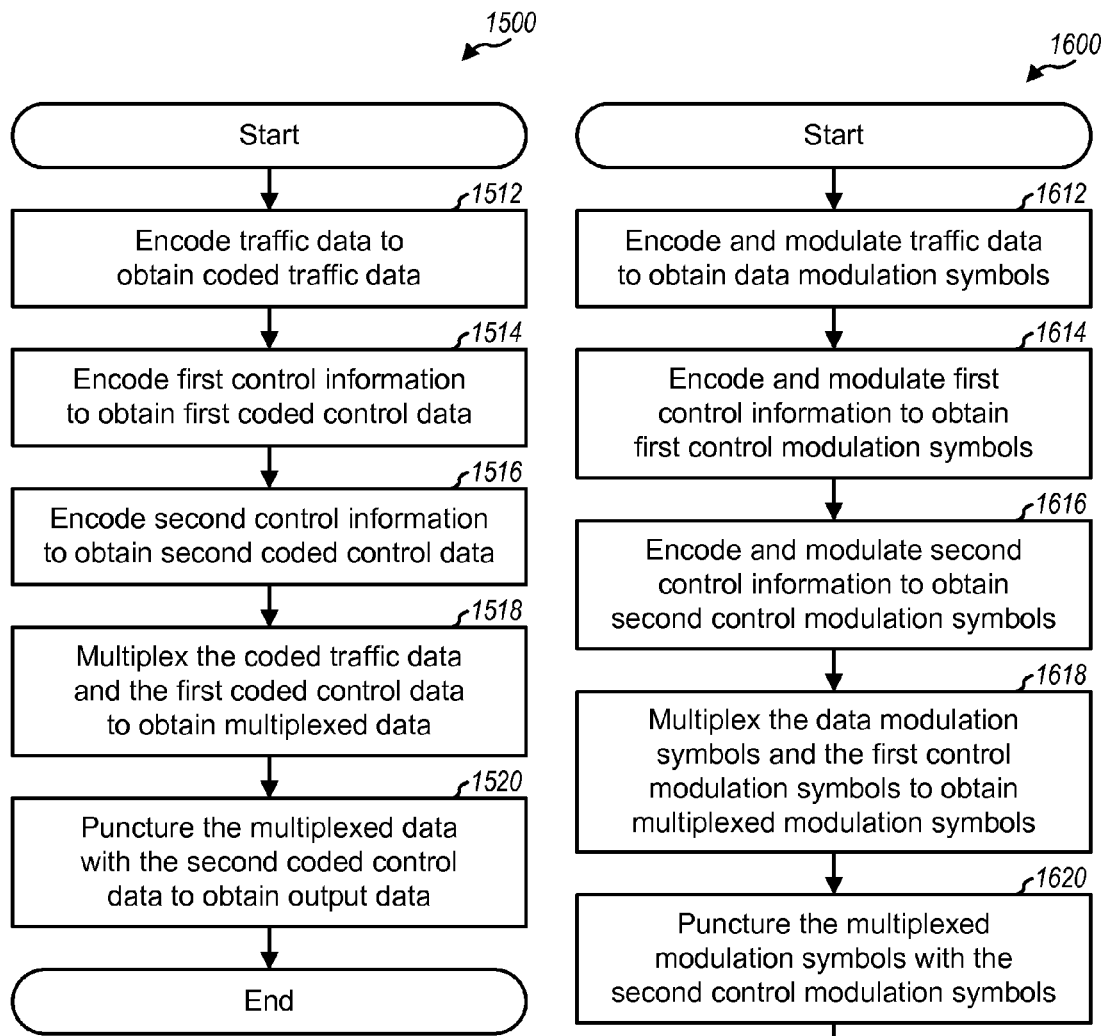

MULTIPLEXING AND TRANSMISSION OF TRAFFIC DATA AND CONTROL INFORMATION IN A WIRELESS COMMUNICATION SYSTEM

The present application is a continuation of U.S. application Ser. No. 12/185,597, entitled "MULTIPLEXING AND TRANSMISSION OF TRAFFIC DATA AND CONTROL INFORMATION IN A WIRELESS COMMUNICATION SYSTEM," filed Aug. 4, 2008; which claims priority to provisional U.S. Application Ser. No. 60/954,299, entitled "MULTIPLEXING AND TRANSMISSION STRATEGIES OF CONTROL AND DATA WHEN SIMULTANEOUSLY TRANSMITTED IN THE UL OF E-UTRA," filed Aug. 6, 2007; each of which are assigned to the assignee hereof and incorporated herein by reference.

BACKGROUND

I. Field

The present disclosure relates generally to communication, and more specifically to techniques for transmitting traffic data and control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data on the downlink to a user equipment (UE). The UE may transmit traffic data and/or control information on the uplink to the Node B. The control information sent by the UE may support data transmission by the Node B and/or may be used for other purposes. It may be desirable to transmit traffic data and control information as efficiently as possible in order to improve system performance.

SUMMARY

Techniques for transmitting traffic data and control information in a wireless communication system are described herein. In an aspect, traffic data and control information may be multiplexed at a coded data level. In one design, a UE may encode traffic data (e.g., based on a first coding scheme) to obtain coded traffic data, which is coded data for traffic data. The UE may also encode control information (e.g., based on a second coding scheme) to obtain coded control data, which is coded data for control information. The first and second coding schemes may be selected to obtain the desire protection levels for the traffic data and the control information, respectively. The UE may multiplex the traffic data and the control information after encoding and prior to modulation to obtain multiplexed data. The UE may modulate the multiplexed data based on a common modulation scheme to obtain modulation symbols. The UE may then generate multiple SC-FDMA symbols based on the modulation symbols.

In another aspect, traffic data and control information may be multiplexed at a modulation symbol level. In one design, a UE may encode and modulate traffic data (e.g., based on a variable modulation and coding scheme) to obtain data modulation symbols, which are modulation symbols for traffic data. The UE may encode and modulate control information (e.g., based on a fixed modulation and coding scheme) to obtain control modulation symbols, which are modulation symbols for control information. The UE may scale the data modulation symbols and the control modulation symbols based on first and second gains, respectively, which may be selected to achieve the desired protection levels for the traffic data and the control information. The UE may multiplex the data modulation symbols and the control modulation symbols to obtain multiplexed modulation symbols. The UE may then generate multiple SC-FDMA symbols based on the multiplexed modulation symbols.

In yet another aspect, a UE may perform rate matching for traffic data to account for control information. The UE may encode traffic data to obtain coded traffic data and may encode control information to obtain coded control data. The UE may perform rate matching on the coded traffic data based on the coded control data and possibly other data (e.g., a sounding reference signal) to obtain rate matched traffic data. The UE may then multiplex the rate matched traffic data and the coded control data to obtain multiplexed data. Alternatively, UE may multiplex data modulation symbols obtained from the rate matched traffic data and control modulation symbols obtained from the coded control data.

In yet another aspect, a UE may perform multiplexing and puncturing for different types of control information. The UE may multiplex traffic data and first control information to obtain multiplexed data. The UE may then puncture the multiplexed data with second control information. As used herein, puncturing is a process in which some data is replaced with some other data.

Various aspects and features of the disclosure are described in further detail below.

BRIEF DESCRIPTION OF THE DRAWINGS

FIGS. 5A and 5B show a transmit processor and a transmit chain, respectively, for multiplexing at the coded data level.

FIGS. 6A and 6B show a transmit processor and a transmit chain, respectively, for multiplexing at the modulation symbol level.

FIGS. 7 and 8 show a process and an apparatus, respectively, for multiplexing traffic data and control information at the coded data level.

FIGS. 9 and 10 show a process and an apparatus, respectively, for multiplexing traffic data and control information at the modulation symbol level.

FIGS. 11 and 12 show a process and an apparatus, respectively, for performing rate matching for traffic data based on control information.

FIGS. 13 and 14 show processes and an apparatus for multiplexing and puncturing traffic data with control information.

FIGS. 15 and 16 show processes for multiplexing and puncturing at the coded data level and the modulation symbol level, respectively.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
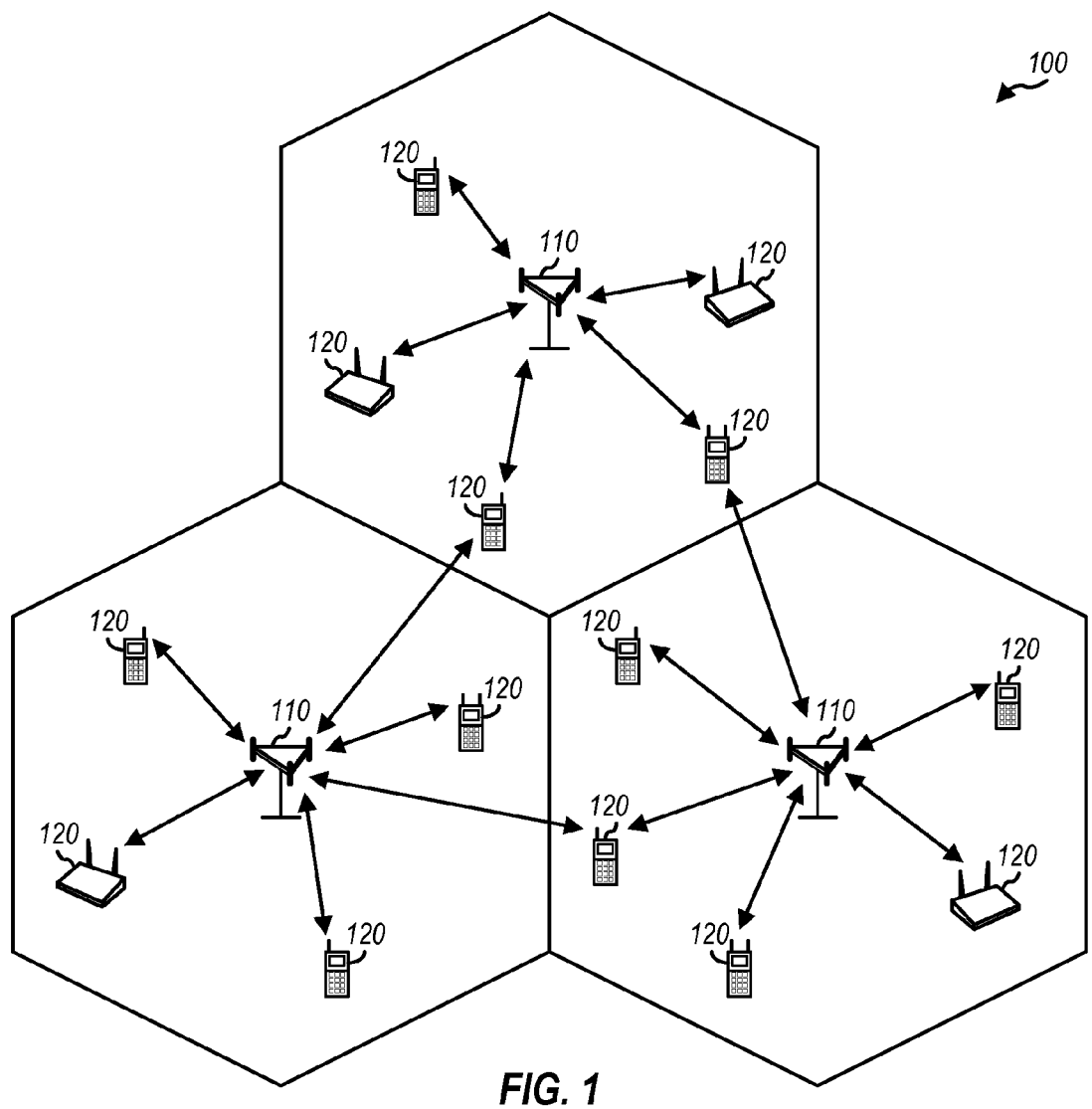
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

The system may support hybrid automatic retransmission (HARQ). For HARQ on the downlink, a Node B may send a transmission for traffic data and may send one or more retransmissions until the traffic data is decoded correctly by a recipient UE, or the maximum number of retransmissions has been sent, or some other termination condition is encountered. HARQ may improve reliability of data transmission.

Figure 2:
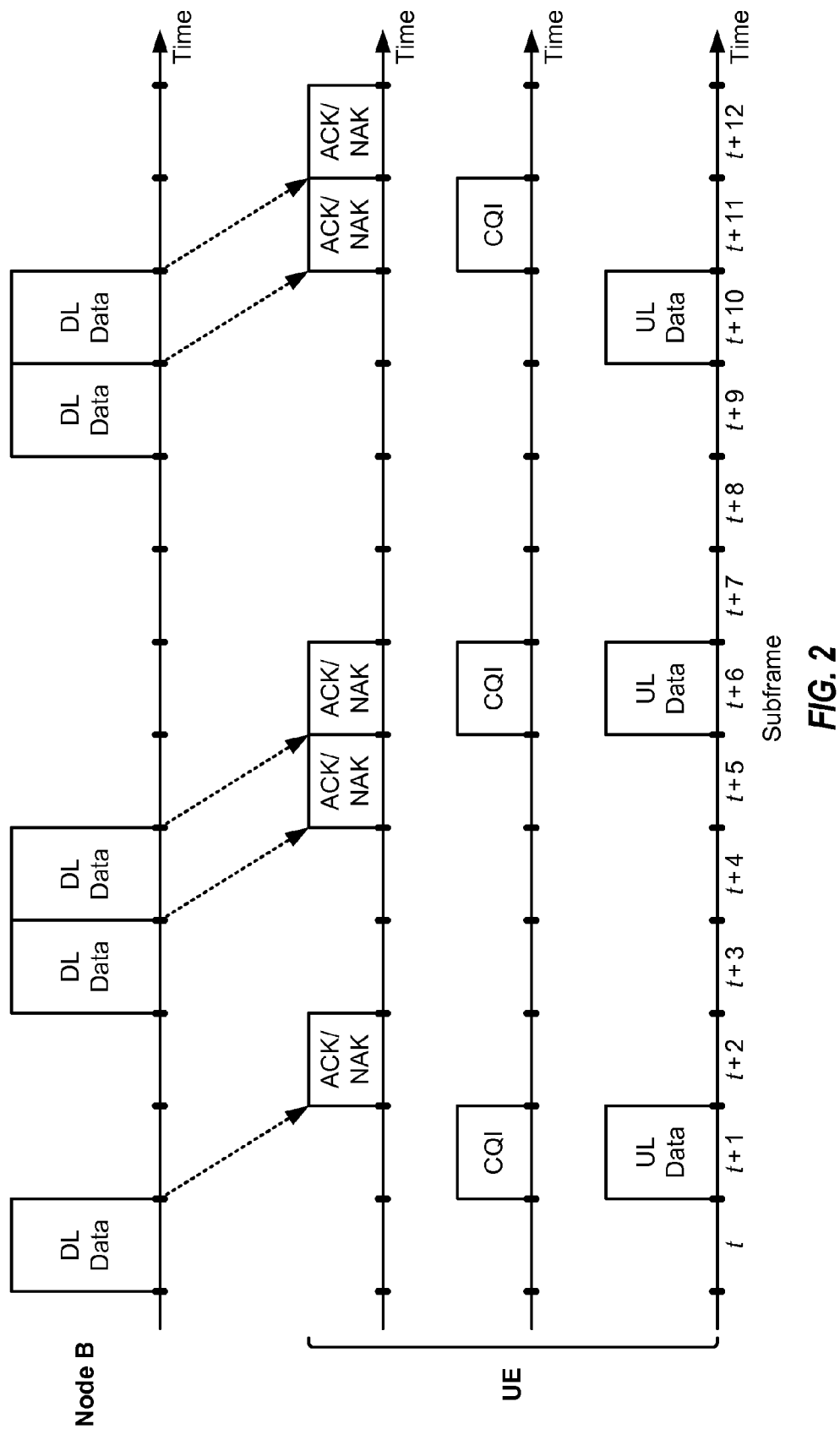
FIG. 2 shows example transmissions on the downlink and uplink.

FIG. 2 shows downlink (DL) transmission by a Node B and uplink (UL) transmission by a UE. The UE may periodically estimate the downlink channel quality for the Node B and may send channel quality indicator (CQI) information to the Node B. The Node B may use the CQI information and/or other information to select the UE for downlink transmission and to select a suitable modulation and coding scheme (MCS) for data transmission to the UE. The Node B may process and transmit traffic data to the UE when there is traffic data to send and system resources are available. The UE may process a downlink data transmission from the Node B and may send an acknowledgement (ACK) if the traffic data is decoded correctly or a negative acknowledgement (NAK) if the traffic data is decoded in error. The Node B may retransmit the traffic data if a NAK is received and may transmit new traffic data if an ACK is received. The UE may also transmit traffic data on the uplink to the Node B when there is traffic data to send and the UE is assigned uplink resources.

As shown in FIG. 2, the UE may transmit traffic data and/or control information, or neither, in any given subframe. The control information may comprise CQI, ACK, and/or other information. The UE may be configured by the Node B to send CQI information periodically at a regular reporting interval. The UE may also be configured to send CQI information in a particular format. Different CQI report formats may be supported, and each CQI report format may convey different CQI information. In any case, the Node B may know when to expect CQI information from the UE based on the CQI reporting configuration for the UE.

The Node B may send a downlink assignment on a Physical Downlink Control Channel (PDCCH) to the UE and may send traffic data on a Physical Downlink Shared Channel (PDSCH) to the UE. The UE may process the PDCCH to detect a downlink assignment for the UE and may process the PDSCH for traffic data if a downlink assignment is received. The UE may send no ACK information, i.e., discontinuous transmission (DTX), if a downlink assignment is not detected, e.g., not sent by the Node B, or sent by the Node B but missed by the UE. If a downlink assignment is detected, then the UE may send either ACK or NAK based on decoding results for the PDSCH. Alternatively, the UE may have a persistent assignment for PDCCH-less operation. In this case, the UE may skip monitoring the PDCCH and may simply process the PDSCH for traffic data in accordance with the persistent assignment.

The UE may also send other control information besides CQI and ACK information. In general, the particular control information to send by the UE may be dependent on various factors such as whether the UE is configured to send CQI information, whether downlink assignment and traffic data are sent on the downlink, whether traffic data is sent on the downlink with multiple-input multiple-output (MIMO), etc. As an example, for MIMO, the control information sent by the UE may include a rank indicator (RI) that conveys the number of layers or spatial streams to send on the downlink, precoding matrix indicator (PMI) information that conveys a precoding matrix to use for precoding for downlink data transmission, etc.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 3:
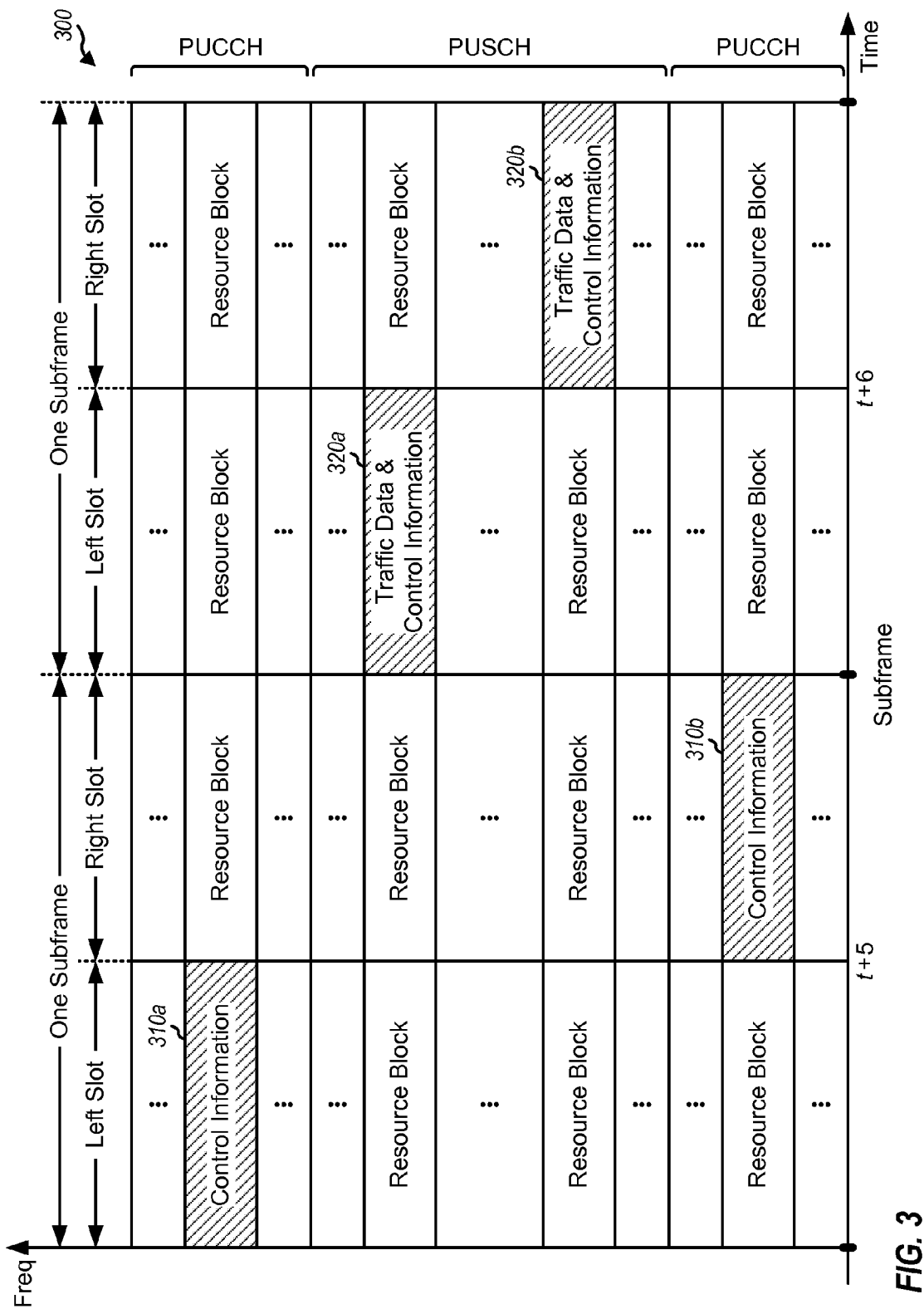
FIG. 3 shows an example transmission structure for the uplink.

FIG. 3 shows a design of a transmission structure 300 that may be used for the uplink. The transmission timeline may be partitioned into units of subframes. A subframe may have a predetermined duration, e.g., one millisecond (ms), and may be partitioned into two slots. Each slot may include a fixed or configurable number of symbol periods, e.g., six symbol periods for an extended cyclic prefix or seven symbol periods for a normal cyclic prefix.

For the uplink, K total subcarriers may be available and may be grouped into resource blocks. Each resource block may include N subcarriers (e.g., N=12 subcarriers) in one slot. The available resource blocks may be partitioned into a Physical Uplink Shared Channel (PUSCH) region and a Physical Uplink Control Channel (PUCCH) region. The PUCCH region may include resource blocks near the two edges of the system bandwidth, as shown in FIG. 3. The PUSCH region may include all resource blocks not assigned to the PUCCH region. A given UE may be assigned resource blocks from the PUCCH region to transmit control information to a Node B. The UE may also be assigned resource blocks from the PUSCH region to transmit traffic data to the Node B. The resource blocks may be paired, and an uplink transmission may span both slots in a subframe. For a given PUCCH transmission, one resource block near one band edge may be used in the first slot of a subframe, and another resource block near the opposite band edge may be used in the second slot of the subframe, as shown in FIG. 3.

Figure 4:
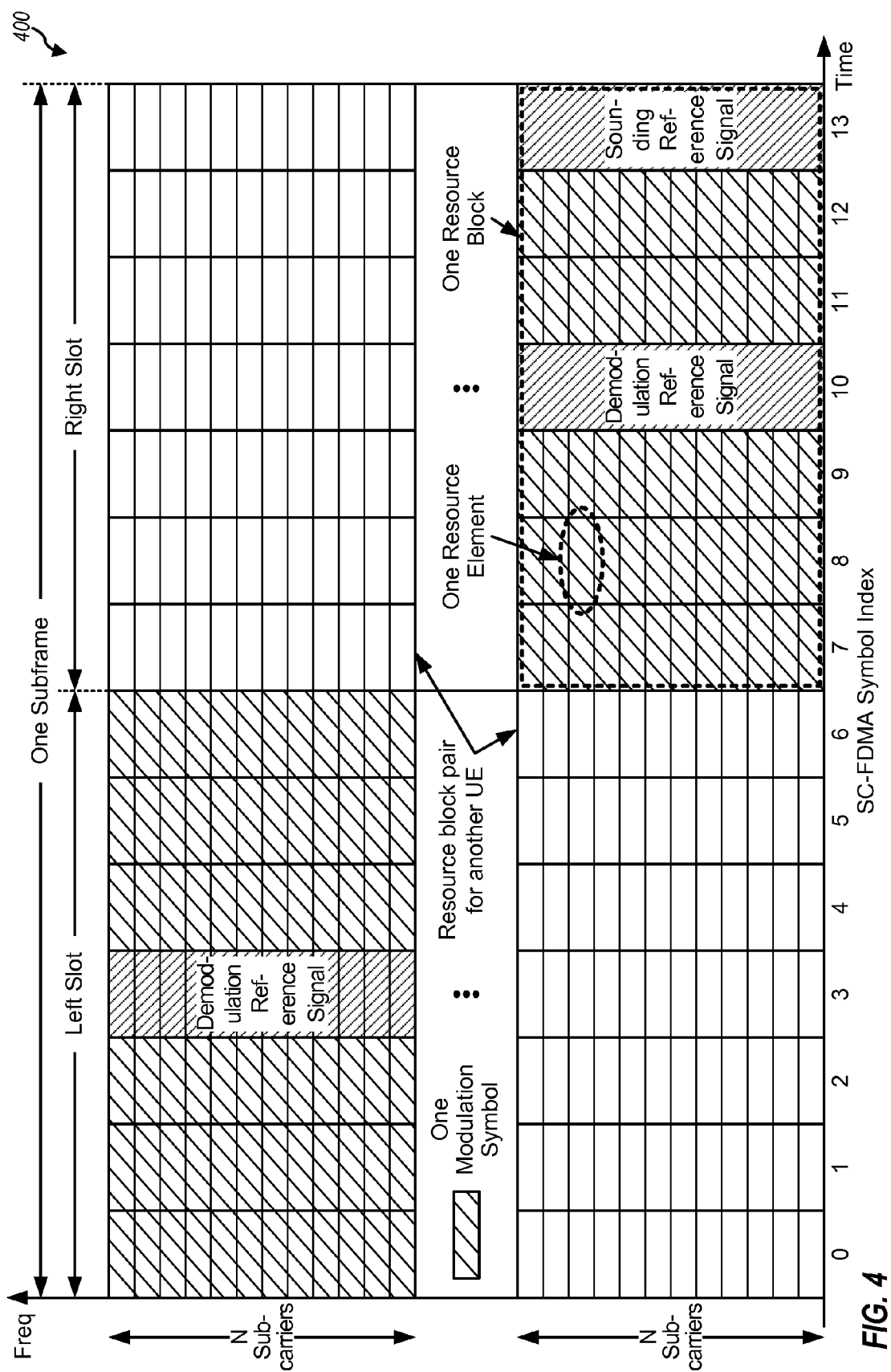
FIG. 4 shows an example transmission on the uplink by a UE.

FIG. 4 shows an example transmission on the PUSCH. For normal cyclic prefix, each subframe includes two slots, the left slot includes seven symbol periods 0 through 6, and the right slot includes seven symbol periods 7 through 13, as shown in FIG. 4. In this example, the UE is assigned two resource blocks for the PUSCH. The two resource blocks may occupy different sets of subcarriers when frequency hopping is enabled, as shown in FIG. 4. Each resource block includes 12×7=84 resource elements. Each resource element covers one subcarrier in one symbol period and may be used to send one modulation symbol.

The UE may transmit a demodulation reference signal (DRS) in the middle symbol period of each slot, as shown in FIG. 4. The UE may also transmit a sounding reference signal (SRS) in the last symbol period of a subframe, as shown in FIG. 4. The sounding reference signal may be sent at a predetermined rate and may or may not be present in a given subframe. The UE may transmit modulation symbols for traffic data and/or control information in resource elements not used for the demodulation and sounding reference signals. The demodulation reference signal may be used by the Node B for coherent detection of the modulation symbols. The sounding reference signal may be used by the Node B to estimate the received signal quality of the uplink for the UE.

It may be desirable for a UE to transmit using localized frequency division multiplexing (LFDM) regardless of whether the UE is transmitting only traffic data, or only control information, or both traffic data and control information in a given subframe. LFDM is a special case of SC-FDM in which a transmission is sent on contiguous subcarriers. LFDM may result in a lower peak-to-average power ratio (PAPR), which may allow a power amplifier to operate at higher output power and may thus improve throughput and/or link margin for the UE. To transmit using LFDM, the UE may send control information in assigned resource blocks from the PUCCH region (e.g., resource blocks 310a and 310b in FIG. 3) when there is no traffic data to send. The UE may send only traffic data or both traffic data and control information in assigned resource blocks from the PUSCH region (e.g., resource blocks 320a and 320b in FIG. 3) when there is traffic data to send. The PUCCH region may overlap the PUSCH region, and resource blocks in PUCCH region may be used for PUSCH transmission if a scheduler knows that these resource blocks will not be used for PUCCH transmission. In any case, the SC-FDMA property of a waveform may always be maintained for the UE.

The UE may multiplex and transmit traffic data and control information in various manners. In an aspect, two multiplexing schemes may be used to transmit traffic data and control information and may be summarized as follows.

Multiplexing scheme 1 may have the following characteristics:
  Multiplex traffic data and control information at the coded data level,
  Encoding of control information depends on the MCS of traffic data,
  Multiplexed traffic data and control information are scrambled and modulated, and
  Common modulation and power level for both traffic data and control information.

Multiplexing scheme 2 may have the following characteristics:
  Multiplex traffic data and control information at the modulation symbol level,
  Fixed coding and modulation scheme for control information,
  Power level of control information may be varied independently of power level of traffic data to obtain the desired protection levels for both.

Figure 5A:
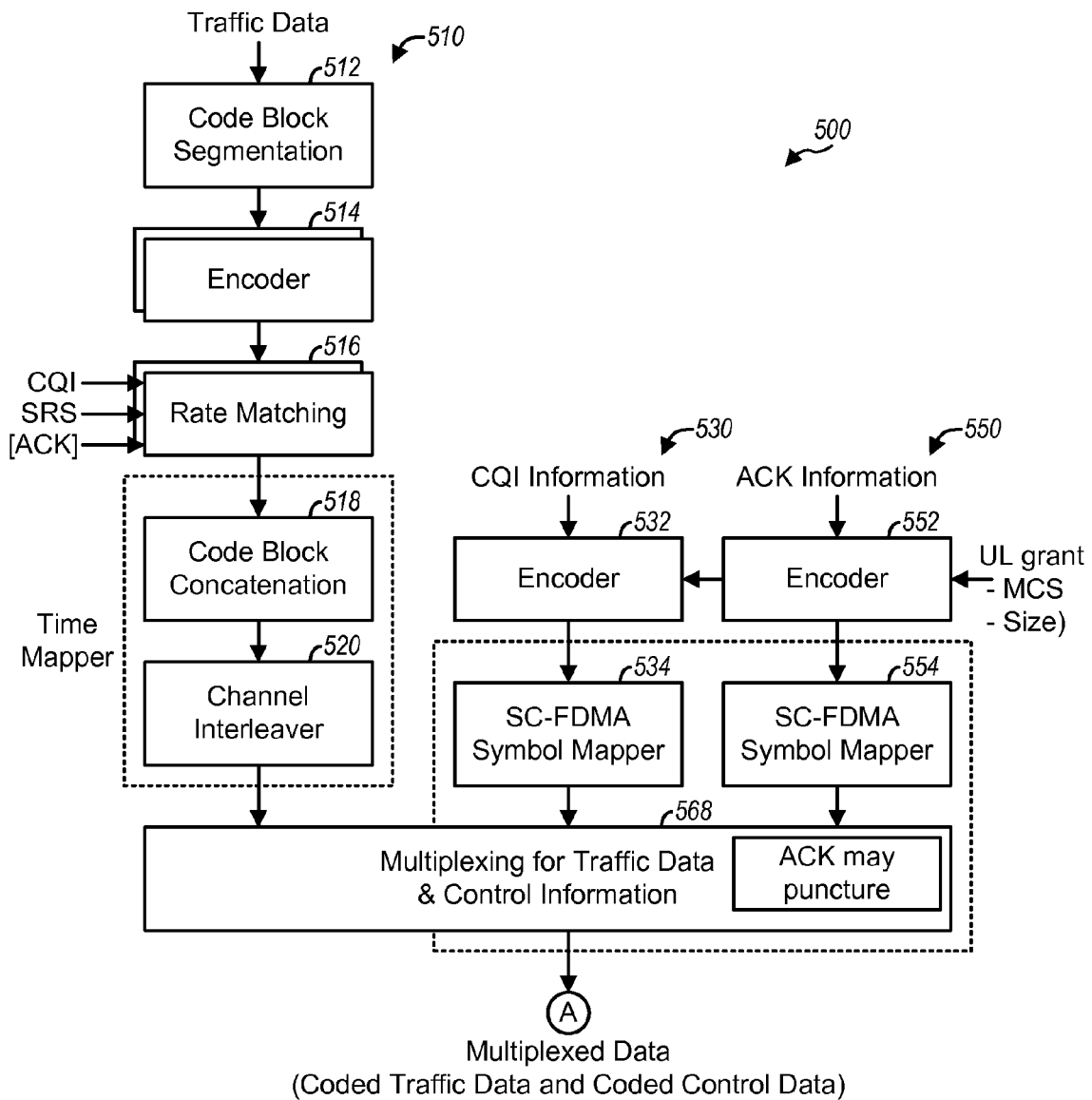

FIG. 5A shows a block diagram of a design of a transmit processor 500 that implements multiplexing scheme 1. In this design, transmit processor 500 includes a first path 510 for traffic data, a second path 530 for CQI information, and a third path 550 for ACK information.

In first path 510, a segmentation unit 512 may partition incoming traffic data into code blocks. Each code block may include a particular number of data bits and may be appended with a cyclic redundancy check (CRC). A channel encoder 514 may encode each code block in accordance with a Turbo code and provide a corresponding Turbo coded block. Each Turbo coded block may include coded bits comprising (i) systematic bits that correspond to the data bits in the code block and (ii) parity bits generated by passing the data bits through one or more constituent encoders. A rate matching unit 516 may repeat or delete a sufficient number of coded bits in each Turbo coded block and provide a desired number of coded bits for that Turbo coded block. Puncturing refers to deletion of bits whereas rate matching refers to deletion or repetition of bits. For a given resource allocation and modulation scheme, the number of "available-for-transmission" coded bits that can be sent may be calculated. Rate matching bridges the number of coded bits from encoding to the number of available-for-transmission coded bits from the resource allocation. If the number of coded bits is smaller than the number of available-for-transmission coded bits, then rate matching may repeat some coded bits until all the resources available for transmission are filled. Conversely, if the number of coded bits is larger than the number of available-for-transmission coded bits, then rate matching may delete some coded bits until the number of available-for-transmission coded bits is obtained. The number of coded bits to repeat or delete for each Turbo coded block may be dependent on various factors such as the amount of resources available for transmission on the PUSCH, the amount of coded control data to multiplex with the coded traffic data, whether a sounding reference signal is being sent, etc. A concatenation unit 518 may concatenate all Turbo coded blocks. A channel interleaver 520 may interleave or reorder the bits from concatenation unit 518 and provide interleaved bits for each SC-FDMA symbol. The concatenation and interleaving may also be performed in a single step with a time mapper.

In second path 530, a channel encoder 532 may encode the CQI information based on a block code and provide coded CQI data. The number of coded bits for the coded CQI data may be dependent on various factors such as the CQI report format used by the UE, the size of an uplink grant for the PUSCH, the MCS for the traffic data, etc. Different CQI contents and hence different numbers of CQI bits may be sent for different CQI report formats. More coded bits may be generated for a larger CQI report, and vice versa. The number of coded bits may also be dependent on the size of the uplink grant. For example, more coded bits may be allocated for CQI information for a larger uplink grant, and vice versa. The number of coded bits may also be dependent on the MCS for traffic data. A more benign channel condition may be inferred from use of a higher MCS for traffic data whereas a more challenged channel condition may be inferred from use of a lower MCS for traffic data. In any case, an SC-FDMA symbol mapper 534 may map the coded CQI data from channel encoder 532 to SC-FDMA symbols and may provide coded bits for each SC-FDMA symbol.

In third path 550, a channel encoder 552 may encode the ACK information based on a block code and provide coded ACK data. The number of coded bits for the coded ACK data may be dependent on various factors such as whether traffic data was received from the Node B, the number of layers used to send the traffic data, the MCS for traffic data, etc. An SC-FDMA symbol mapper 554 may map the coded ACK data from channel encoder 552 to SC-FDMA symbols and may provide coded bits for each SC-FDMA symbol. SC-FDMA symbol mappers 534 and 554 may perform mapping such that the coded CQI data and the coded ACK data, if presence, are sent in each SC-FDMA symbol in a subframe in which control information is sent.

A multiplexer 568 may receive coded traffic data from first path 510, coded CQI data from second path 530, and coded ACK data from third path 550. Multiplexer 568 may multiplex the coded traffic data and the coded CQI data. In one design, multiplexer 568 may also multiplex the coded ACK data with the coded traffic data and the coded CQI data. In another design, multiplexer 568 may puncture the multiplexed coded traffic data and coded CQI data with the coded ACK data. In any case, multiplexer 568 may provide multiplexed data comprising the coded traffic data, the coded CQI data, and the coded ACK data.

FIG. 5B shows a block diagram of a design of a transmit chain 570 that may be used with transmit processor 500 in FIG. 5A. Within transmit chain 570, a scrambler 572 may receive the multiplexed data for each SC-FDMA symbol from multiplexer 568, scramble the multiplexed data, and provide scrambled bits. A modulator/symbol mapper 574 may map the scrambled bits to modulation symbols based on a modulation scheme such as M-ary phase shift keying (PSK) or M-ary quadrature amplitude modulation (QAM).

An SC-FDMA symbol generator 580 may receive the modulation symbols from modulator 574 and generate SC-FDMA symbols. Within generator 580, a discrete Fourier transform (DFT) unit 582 may receive M modulation symbols for one SC-FDMA symbol, perform an M-point DFT on the M modulation symbols, and provide M frequency-domain values. A frequency mapper 584 may map the M frequency-domain values to M subcarriers in one or more resource blocks assigned to the UE and may map zero values to remaining subcarriers. An inverse fast Fourier transform (IFFT) unit 586 may perform a K-point IFFT on K mapped values for the K total subcarriers and provide K time-domain samples for a useful portion. A cyclic prefix generator 588 may copy the last C samples of the useful portion and append these C samples to the front of the useful portion to form an SC-FDMA symbol containing K+C samples. The SC-FDMA symbol may be sent in one symbol period, which may include K+C sample periods. A gain unit 590 may scale the samples to obtain the desired transmit power for the uplink transmission on the PUSCH.

The various processing blocks in FIGS. 5A and 5B may be implemented as described in 3GPP TS 36.211, entitled "Evolved Universal Terrestrial Radio Access (E-UTRA); Physical Channels and Modulation," and in 3GPP TS 36.212, entitled "Evolved Universal Terrestrial Radio Access (E-UTRA); Multiplexing and channel coding." These documents are publicly available.

FIGS. 5A and 5B show example designs of transmit processor 500 and transmit chain 570, respectively. The processing may also be performed in a different order than the order shown in FIGS. 5A and 5B. For example, the multiplexing of traffic data and control information may be performed prior to the channel interleaving. Transmit processor 500 and/or transmit chain 570 may also include different and/or additional processing blocks. For example, transmit processor 500 may include another path for rank indicator.

The UE may receive an uplink grant for transmission on the PUSCH. The uplink grant may include a modulation and coding scheme (MCS) to use for traffic data sent on the PUSCH. The MCS may indicate a specific coding scheme or code rate and a specific modulation scheme. The MCS may be selected by the Node B based on the uplink channel quality to obtain a desired protection level or reliability for traffic data, e.g., a target packet error rate (PER) for traffic data. For multiplexing scheme 1, traffic data and control information use the same modulation scheme, which may be conveyed by the MCS selected for traffic data. A suitable coding scheme may be selected for control information to obtain a desired protection level for control information, e.g., a target block error rate (BLER) for control information.

In one design, the coding for control information may be variable and may be selected to achieve the desired protection level for control information. Due to multiplexing at the coded data level, the same modulation scheme and power level may be used for both traffic data and control information. Different protection levels may be achieved for traffic data and control information by using different coding schemes. The coding scheme for traffic data may be determined by the MCS selected for traffic data. The coding scheme for control information may be selected based on various factors such as the MCS selected for traffic data, the uplink grant size (which may affect the amount of resources available for control information), the amount of transmit power available at the UE, etc. In one design, a look-up table may be used to determine a coding scheme for control information based on the MCS for traffic data. The look-up table may include one entry for each possible MCS that can be used for traffic data. Each entry may indicate a particular coding scheme to use for control information to obtain the target BLER. The look-up table may be generated based computer simulation, empirical testing, etc.

The resources allocated to the UE by an uplink grant may be used to send traffic data, control information, a demodulation reference signal, and a sounding reference signal, as shown in FIG. 4. Some of the allocated resources may be used to send the reference signals, and the remaining resources may be used to send traffic data and control information. If a sounding reference signal is sent, then less resources would be available to send traffic data and control information. The total amount of coded data that can be sent may be limited by the amount of resources available to send traffic data and control information. The sum of coded traffic data and coded control data may exceed the total amount of coded data that can be sent on the available resources. Rate matching may then be performed to delete a sufficient amount of coded traffic data such that the undeleted coded traffic data plus the coded control data can be sent on the available resources. Rate matching may thus attempt to match the amount of coded traffic data with the amount of resources available for transmission.

Rate matching and multiplexing may be performed in various manners for multiplexing scheme 1. In one design, the coded traffic data may be multiplexed with all coded control data, e.g., coded CQI data and coded ACK data. In this design, rate matching may be performed around all types of control information being sent with traffic data. For example, the available resources may be used to send $N_A$ coded bits. $N_1$ coded bits may be generated for traffic data, $N_2$ coded bits may be generated for CQI information, and $N_3$ coded bits may be generated for ACK information, where $N_1+N_2+N_3=N_T>N_A$. Rate matching may then delete $N_T-N_A$ coded bits for traffic data, so that the total number of coded bits for traffic data (after rate matching) and CQI and ACK information is equal to $N_A$.

In another design, the coded traffic data may be multiplexed with coded data for certain control information and may be punctured by coded data for other control information. Certain control information may be known to be present when traffic data is sent. For example, the UE may send CQI information at a regular reporting interval. Whether CQI information will be sent in a given subframe may then be known a priori based on the reporting interval. If it is known that CQI information will be present, then the coded traffic data may be rate matched to account for the coded CQI data. The coded traffic data (after rate matching) and the coded CQI data may then be multiplexed to obtain the desired number of coded bits. Since the Node B also has knowledge of the CQI reporting by the UE, the Node B can determine that coded CQI data is multiplexed with coded traffic data whenever CQI information is sent on the PUSCH.

In contrast, certain control information may or may not be present when traffic data is sent. For example, the UE may or may not send ACK information in a given subframe depending on decoding results for the PDCCH and PDSCH. If it is not known whether ACK information will be present, then the coded traffic data may be rate matched based on an assumption that the ACK information will not be present. The ACK information would then have no effect on rate matching for the traffic data. If this assumption turns out to be wrong, then the coded ACK data may puncture the other coded data and may be sent. In one design, the coded ACK data may puncture only the coded traffic data. In another design, the coded ACK data may puncture the multiplexed data, which may include the coded traffic data and the coded CQI data. In this design, some coded CQI data may be punctured by the coded ACK data.

In yet another design, the coded traffic data may be punctured by all coded control data, e.g., coded CQI data and coded ACK data. In general, whether to use multiplexing or puncturing for a particular type of control information may be dependent on various factors such as whether it is known that the control information will be present, the amount of control information to send, etc. For example, rate matching may be used for a larger amount of control information whereas puncturing may be used for a smaller amount of control information.

For a highly asymmetric uplink/downlink partition in a TDD system, there may be many downlink subframes and few uplink subframes, e.g., nine downlink subframes and one uplink subframe. In that case, the UE may send one or many ACKs in an uplink subframe. Unless a scheduler provides a sufficiently large resource allocation for the PUSCH, the transmission of ACK information alone may occupy a large portion of the resource allocation. Heavy/extreme puncturing may be used to accommodate the large amount of ACK information but may result in many systematic bits for traffic data being deleted. It may be desirable to rate match the traffic data around the ACK information, e.g., ACK transmission may be allocated a set of resources. In any case, rate matching may avoid puncturing too many systematic bits for traffic data.

In one design, multiplexing and puncturing may be performed such that control information is mapped to all SC-FDMA symbols sent on the PUSCH. This design may provide time diversity, which may improve performance. The UE may be assigned a resource block on a set of subcarriers in the left slot of a subframe and may be assigned another resource block on a different set of subcarriers in the right slot of the subframe with frequency hopping, as shown in FIG. 4. The control information may be mapped to SC-FDMA symbols in both the left and right slots of the subframe. This may provide frequency diversity, which may also improve performance. In another design, certain control information (e.g., ACK information) may be mapped to SC-FDMA symbols close to the demodulation reference signal in each slot. This design may improve reliability for the control information if the demodulation reference signal is used for coherent detection.

For the designs shown in FIGS. 5A and 5B, the multiplexed data from multiplexer 568 may be processed by a single transmit chain 570 composed of scrambler 572 to gain unit 590 in FIG. 5B. The multiplexed data may undergo common scrambling, common modulation, common precoding (if applicable), common SC-FDMA symbol generation, and a single gain stage for the PUSCH transmission. This transmit chain may also be used for coded traffic data when only traffic data is sent on the PUSCH. Thus, for the designs shown in FIGS. 5A and 5B, the processing for the multiplexed traffic data and control information may be fully compatible with the processing for only traffic data.

Figure 6A:
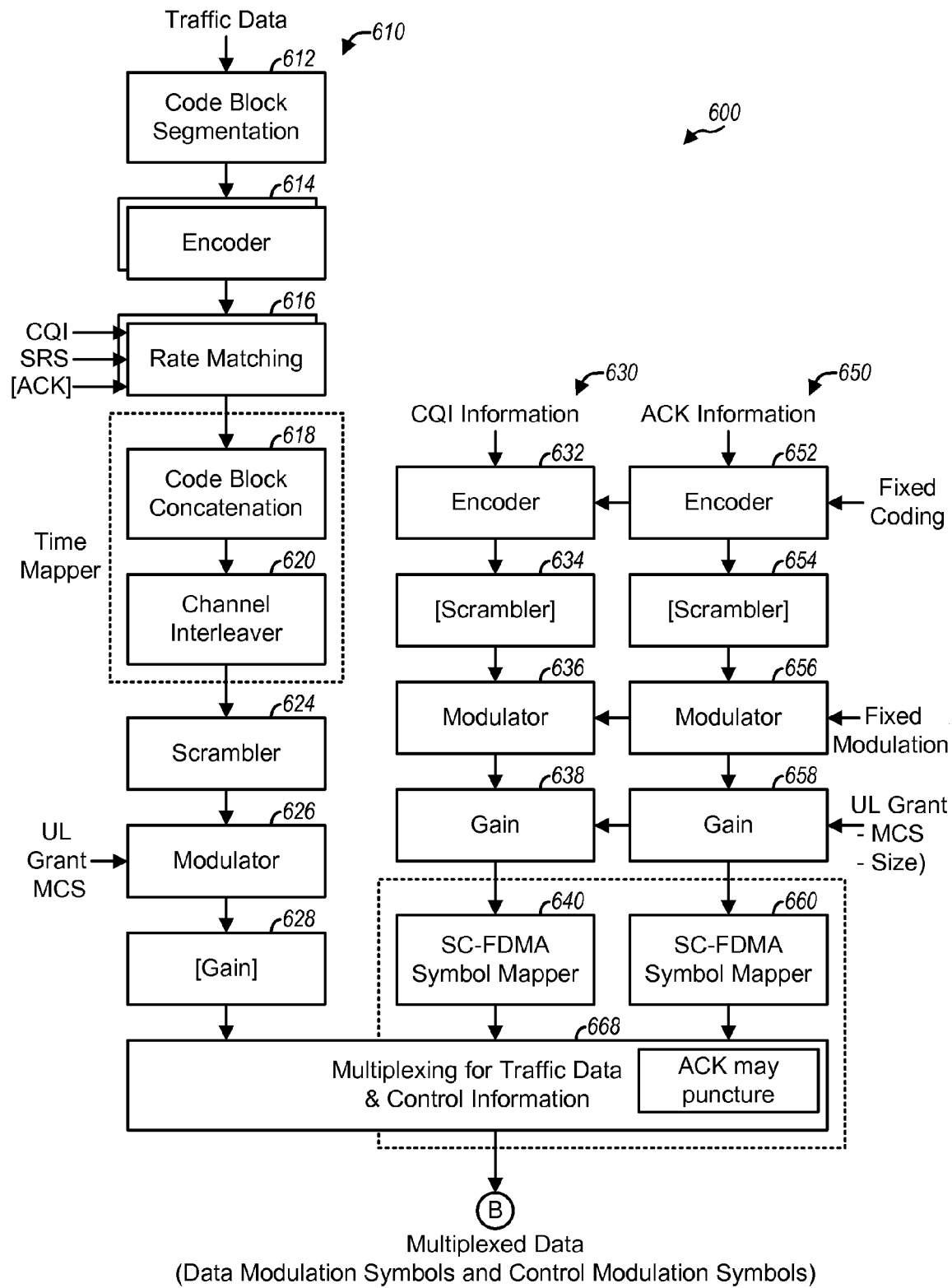

FIG. 6A shows a block diagram of a design of a transmit processor 600 that implements multiplexing scheme 2. In this design, transmit processor 600 includes a first path 610 for traffic data, a second path 630 for CQI information, and a third path 650 for ACK information.

In first path 610, a segmentation unit 612 may partition incoming traffic data into code blocks. A channel encoder 614 may encode each code block and provide a corresponding Turbo coded block. A rate matching unit 616 may repeat or delete a sufficient number of coded bits in each Turbo coded block and provide a desired number of coded bits for that Turbo coded block. A concatenation unit 618 may concatenate all Turbo coded blocks. A channel interleaver 620 may interleave the bits from concatenation unit 618 and provide interleaved data. A scrambler 624 may scramble the interleaved data and provide scrambled bits. A modulator/symbol mapper 626 may map the scrambled bits to modulation symbols based on a modulation scheme for traffic data. A gain unit 628 may scale the modulation symbols from modulator 626 to obtain the desired transmit power for traffic data.

In second path 630, a channel encoder 632 may encode the CQI information and provide coded CQI data. A scrambler 634 may scramble the coded CQI data and provide scrambled bits. A modulator/symbol mapper 636 may map the scrambled bits to modulation symbols based on a modulation scheme for the CQI information. A gain unit 638 may scale the modulation symbols from modulator 636 to obtain the desired transmit power for the CQI information. An SC-FDMA symbol mapper 640 may map the scaled modulation symbols from gain unit 636 to SC-FDMA symbols and may provide modulation symbols for each SC-FDMA symbol.

In third path 650, a channel encoder 652 may encode the ACK information and provide coded ACK data. A scrambler

654 may scramble the coded ACK data and provide scrambled bits. A modulator/symbol mapper 656 may map the scrambled bits to modulation symbols based on a modulation scheme for the ACK information. A gain unit 658 may scale the modulation symbols from modulator 656 to obtain the desired transmit power for the ACK information. An SC-FDMA symbol mapper 660 may map the scaled modulation symbols from gain unit 658 to SC-FDMA symbols and may provide modulation symbols for each SC-FDMA symbol. SC-FDMA symbol mappers 640 and 660 may perform mapping such that the coded CQI data and the coded ACK data, if presence, are sent in each SC-FDMA symbol in a subframe in which control information is sent.

In the design shown in FIG. 6A, the traffic data and control information are multiplexed at the modulation symbol level. A multiplexer 668 may receive modulation symbols for traffic data (or data modulation symbols) from first path 610, modulation symbols for CQI information (or CQI modulation symbols) from second path 630, and modulation symbols for ACK information (or ACK modulation symbols) from third path 650. Multiplexer 668 may multiplex the data modulation symbols and the CQI modulation symbols. In one design, multiplexer 668 may also multiplex the ACK modulation symbols with the data and CQI modulation symbols. In another design, multiplexer 668 may puncture the multiplexed data and CQI modulation symbols with the ACK modulation symbols. In any case, multiplexer 668 may provide multiplexed modulation symbols comprising the data modulation symbols, the CQI modulation symbols, and the ACK modulation symbols.

FIG. 6B shows a block diagram of a design of a transmit chain 670 that may be used with transmit processor 600 in FIG. 6A. Within transmit chain 670, an SC-FDMA symbol generator 680 may receive the multiplexed modulation symbols for each symbol period from multiplexer 668 in FIG. 6A and may generate an SC-FDMA symbol based on the multiplexed modulation symbols. SC-FDMA symbol generator 680 includes a DFT unit 682, a frequency mapper 684, an IFFT unit 686, and a cyclic prefix generator 688 that may operate as described above for units 582 through 588, respectively, in FIG. 5B. A gain unit 690 may scale the samples of the SC-FDMA symbols to obtain the desired transmit power for the uplink transmission on the PUSCH.

FIGS. 6A and 6B show example designs of transmit processor 600 and transmit chain 670, respectively. The processing may also be performed in a different order than the order shown in FIGS. 6A and 6B. For example, the channel interleaving may be performed on the multiplexed modulation symbols. Transmit processor 600 and/or transmit chain 670 may also include different and/or additional processing blocks. For example, transmit processor 600 may include another path for rank indicator.

In one design, a fixed MCS comprising a fixed coding scheme and a fixed modulation scheme may be used for control information. The same fixed MCS may be used for both CQI and ACK information. Alternatively, one fixed MCS may be used for CQI information, and another fixed MCS may be used for ACK information. The MCS(s) for control information may be independent of the MCS for traffic data. Different modulation schemes may be used for traffic data and control information, and the data modulation symbols may be generated based on a signal constellation that is different from the one used for control modulation symbols. In another design, the MCS(s) for control information may be dependent on the MCS for traffic data.

In the design shown in FIG. 6A, scrambling may be performed on the coded data prior to modulation. Scrambling may be performed independently for traffic data and control information. Scrambling may also be performed for traffic data and omitted for control information. In another design, scrambling may be performed on the multiplexed modulation symbols from multiplexer 668.

Rate matching and multiplexing may be performed in various manners for multiplexing scheme 2. In one design, the data modulation symbols may be multiplexed with all control modulation symbols, e.g., CQI and ACK modulation symbols. In this design, rate matching may be performed around all types of control information being sent with traffic data. In another design, the data modulation symbols may be multiplexed with certain control modulation symbols (e.g., CQI modulation symbols) and may be punctured by other control modulation symbols (e.g., ACK modulation symbols). For example, the ACK modulation symbols may puncture only the data modulation symbols or may puncture the multiplexed data and CQI modulation symbols. In yet another design, the data modulation symbols may be punctured by all control modulation symbols, e.g., CQI and ACK modulation symbols. In general, whether to use multiplexing or puncturing for a particular type of control information may be dependent on various factors described above. Rate matching may also be performed around the sounding reference signal and other transmissions being sent with traffic data on the PUSCH.

In one design, multiplexing and puncturing may be performed such that the control modulation symbols are mapped to all SC-FDMA symbols sent on the PUSCH. This design may provide time diversity, which may improve performance. The control modulation symbols may be mapped to SC-FDMA symbols in both slots of a subframe, which may provide frequency diversity when frequency hopping is used. In another design, certain control modulation symbols (e.g., ACK modulation symbols) may be mapped to SC-FDMA symbols close to the demodulation reference signal in each slot. This design may improve reliability for the control information if the demodulation reference signal is used for coherent detection.

For the designs shown in FIGS. 6A and 6B, the multiplexed data and control modulation symbols from multiplexer 668 may be processed by a single transmit chain 670. Gain unit 690 may be used to obtain the desired transmit power for the SC-FDMA symbols.

In the designs shown in FIGS. 6A and 6B, different gains may be applied to the data modulation symbols, the CQI modulation symbols, and the ACK modulation symbols. The gains may be selected to obtain the desired protection levels for traffic data, CQI information, and ACK information. In one design, gain units 628, 638 and 658 may be present, and gain unit 690 may be omitted. In this design, gain unit 628 may apply a gain to obtain the desired transmit power for traffic data. Gain units 638 and 658 may apply gains to obtain the desired protection levels for CQI and ACK information, respectively. In another design, gain units 638, 658 and 690 may be present, and gain unit 628 may be omitted. In this design, gain unit 690 may apply a gain to obtain the desired transmit power for traffic data. Gain units 638 and 658 may provide gains to obtain the desired power offsets between traffic data and CQI and ACK information. The gains may also be applied in other manners. For all designs, the gains for CQI and ACK information may be dependent on various factors such as the MCS for traffic data, the size of the uplink grant, the available transmit power at the UE, etc. The desired protection levels for CQI and ACK information may be achieved by power offsetting the CQI and ACK modulation symbols with respect to the data modulation symbols, e.g., via gain units 638 and 658.

FIGS. 5A and 6A show example designs of transmit processors 500 and 600 for multiplexing schemes 1 and 2, respectively. Multiplexing scheme 1 multiplexes traffic data and control information at the coded data level and obtains the desired protection levels for control information with variable coding and a fixed power level. Multiplexing scheme 2 multiplexes traffic data and control information at the modulation symbol level and obtains the desired protection levels for control information with fixed coding and variable power level. Multiplexing scheme 1 may provide good PAPR since the same modulation scheme and the same power setting are used for both traffic data and control information. Multiplexing scheme 2 may simplify processing at the UE and the Node B since a fixed MCS may be used for the control information.

FIG. 7 shows a design of a process 700 for processing traffic data and control information in accordance with multiplexing scheme 1. Process 700 may be performed by a UE (as described below) or some other entity.

The UE may determine a first coding scheme for traffic data based on a modulation and coding scheme selected for the traffic data (block 712). The UE may determine a second coding scheme for control information based on the modulation and coding scheme for the traffic data (block 714). The control information may comprise CQI information, ACK information, PMI information, rank information, other information, or any combination thereof. The UE may encode the traffic data based on the first coding scheme to obtain coded traffic data (block 716). The UE may encode the control information based on the second coding scheme to obtain coded control data (block 718). The UE may perform rate matching on the coded traffic data based on the coded control data and possibly other data (e.g., a sounding reference signal) being sent with the traffic data and the control information.

The UE may multiplex the traffic data and the control information after encoding and prior to modulation to obtain multiplexed data (block 720). The UE may perform multiplexing such that (i) the control information is sent in each SC-FDMA symbol generated for the traffic data and the control information, (ii) the control information is sent in SC-FDMA symbols adjacent to at least one SC-FDMA symbol for a demodulation reference signal, and/or (iii) other transmission goals can be achieved. The UE may modulate the multiplexed data based on a common modulation scheme applicable for both the traffic data and the control information to obtain modulation symbols (block 722). The UE may generate multiple SC-FDMA symbols based on the modulation symbols obtained from the multiplexed data (block 724). The UE may scale the traffic data and the control information based on a common gain applicable for both the traffic data and the control information.

FIG. 8 shows a design of an apparatus 800 for processing traffic data and control information. Apparatus 800 includes a module 812 to determine a first coding scheme for traffic data based on a modulation and coding scheme selected for the traffic data, a module 814 to determine a second coding scheme for control information based on the modulation and coding scheme for the traffic data, a module 816 to encode the traffic data based on the first coding scheme to obtain coded traffic data, a module 818 to encode the control information based on the second coding scheme to obtain coded control data, a module 820 to multiplex the traffic data and the control information after encoding and prior to modulation to obtain multiplexed data, a module 822 to modulate the multiplexed data based on a common modulation scheme to obtain modulation symbols, and a module 824 to generate multiple SC-FDMA symbols based on the modulation symbols.

FIG. 9 shows a design of a process 900 for processing traffic data and control information in accordance with multiplexing scheme 2. Process 900 may be performed by a UE (as described below) or some other entity.

The UE may encode and modulate traffic data (e.g., based on a variable modulation and coding scheme) to obtain data modulation symbols (block 912). The UE may encode and modulate control information (e.g., based on a fixed modulation and coding scheme) to obtain control modulation symbols (block 914). The control information may comprise CQI information, ACK information, PMI information, rank information, other information, or any combination thereof.

The UE may scale the data modulation symbols based on a first gain (block 916) and may scale the control modulation symbols based on a second gain that is potentially different from the first gain (block 918). The first and second gains may be selected to achieve the desired protection levels for the traffic data and the control information, respectively. The UE may multiplex the data modulation symbols and the control modulation symbols to obtain multiplexed modulation symbols (block 920). The UE may perform multiplexing to achieve any of the goals described above for FIG. 7. The UE may generate multiple SC-FDMA symbols based on the multiplexed modulation symbols (block 922).

FIG. 10 shows a design of an apparatus 1000 for processing traffic data and control information. Apparatus 1000 includes a module 1012 to encode and modulate traffic data to obtain data modulation symbols, a module 1014 to encode and modulate control information to obtain control modulation symbols, a module 1016 to scale the data modulation symbols based on a first gain, a module 1018 to scale the control modulation symbols based on a second gain potentially different from the first gain, a module 1020 to multiplex the data modulation symbols and the control modulation symbols to obtain multiplexed modulation symbols, and a module 1022 to generate multiple SC-FDMA symbols based on the multiplexed modulation symbols.

FIG. 11 shows a design of a process 1100 for processing traffic data and control information. Process 1100 may be performed by a UE (as described below) or some other entity. The UE may encode traffic data to obtain coded traffic data (block 1112). The UE may encode control information to obtain coded control data (block 1114). The UE may perform rate matching on the coded traffic data based on the coded control data to obtain rate matched traffic data (block 1116). The UE may perform rate matching on the coded traffic data based further on a sounding reference signal sent with the traffic data and the control information. The UE may multiplex the rate matched traffic data and the coded control data to obtain multiplexed data (block 1118).

In one design, which is shown in FIG. 5A, the traffic data and the control information may be encoded based on different coding schemes. In another design, which is shown in FIG. 6A, the UE may modulate the coded traffic data to obtain data modulation symbols and may modulate the coded control data to obtain control modulation symbols. The UE may then multiplex the data modulation symbols and the control modulation symbols to obtain multiplexed modulation symbols. The traffic data may be encoded and modulated based on a variable modulation and coding scheme. The control information may be encoded and modulated based on a fixed modulation and coding scheme.

The UE may encode second control information to obtain second coded control data. In one design, the UE may perform rate matching on the coded traffic data based further on the second coded control data and may multiplex the rate matched traffic data, the coded control data, and the second coded control data to obtain the multiplexed data. In another design, the UE may puncture the multiplexed data with the second coded control data.

FIG. 12 shows a design of an apparatus 1200 for processing traffic data and control information. Apparatus 1200 includes a module 1212 to encode traffic data to obtain coded traffic data, a module 1214 to encode control information to obtain coded control data, a module 1216 to perform rate matching on the coded traffic data based on the coded control data to obtain rate matched traffic data, and a module 1218 to multiplex the rate matched traffic data and the coded control data to obtain multiplexed data.

FIG. 13 shows a design of a process 1300 for processing traffic data and control information. Process 1300 may be performed by a UE (as described below) or some other entity. The UE may multiplex traffic data and first control information to obtain multiplexed data (block 1312). The UE may then puncture the multiplexed data with second control information (block 1314).

The first control information may comprise CQI information or other control information configured by higher layers, and the second control information may comprise ACK information, as shown in FIGS. 5A and 6A. The first and second control information may also comprise other types of control information. The first control information may be sent periodically at a predetermined rate, which may be configured for the UE. The second control information may be selectively sent, e.g., based on transmissions received by the UE.

FIG. 14 shows a design of an apparatus 1400 for processing traffic data and control information. Apparatus 1400 includes a module 1412 to multiplex traffic data and first control information to obtain multiplexed data, and a module 1414 to puncture the multiplexed data with second control information.

The modules in FIGS. 8, 10, 12 and 14 may comprise processors, electronics devices, hardware devices, electronics components, logical circuits, memories, etc., or any combination thereof.

FIG. 15 shows a design of a process 1500 for multiplexing and puncturing at the coded data level. Process 1500 may be one design of process 1300 in FIG. 13. A UE may encode traffic data to obtain coded traffic data (block 1512) and may encode first control information to obtain first coded control data (block 1514). The traffic data and the first control information may be encoded based on different coding schemes. The UE may encode second control information to obtain second coded control data (block 1516). The UE may multiplex the coded traffic data and the first coded control data to obtain multiplexed data (block 1518). The UE may then puncture the multiplexed data with the second coded control data to obtain output data (block 1520). The UE may modulate the output data based on a modulation scheme to obtain to modulation symbols. Blocks 1518 and 1520 in FIG. 15 may correspond to blocks 1312 and 1314, respectively, in FIG. 13. Blocks 1512, 1514 and 1516 may occur prior to block 1518.

FIG. 16 shows a design of a process 1600 for multiplexing and puncturing at the modulation symbol level. Process 1600 may be another design of process 1300 in FIG. 13. A UE may encode and modulate traffic data (e.g., based on a variable modulation and coding scheme) to obtain data modulation symbols (block 1612). The UE may encode and modulate first control information (e.g., based on a fixed modulation and coding scheme) to obtain first control modulation symbols (block 1614). The UE may encode and modulate second control information to obtain second control modulation symbols (block 1616). The UE may multiplex the data modulation symbols and the first control modulation symbols to obtain multiplexed modulation symbols (block 1618). The UE may then puncture the multiplexed modulation symbols with the second control modulation symbols (block 1620). The UE may apply different gains for the traffic data and the first and second control information to obtain the desired protection levels for the traffic data and the control information. Blocks 1618 and 1620 in FIG. 16 may correspond to blocks 1312 and 1314, respectively, in FIG. 13. Blocks 1612, 1614 and 1616 may occur prior to block 1618.

For the designs in FIGS. 15 and 16, the UE may perform rate matching for the traffic data based on the first control information, without considering the second control information.

Figure 17:
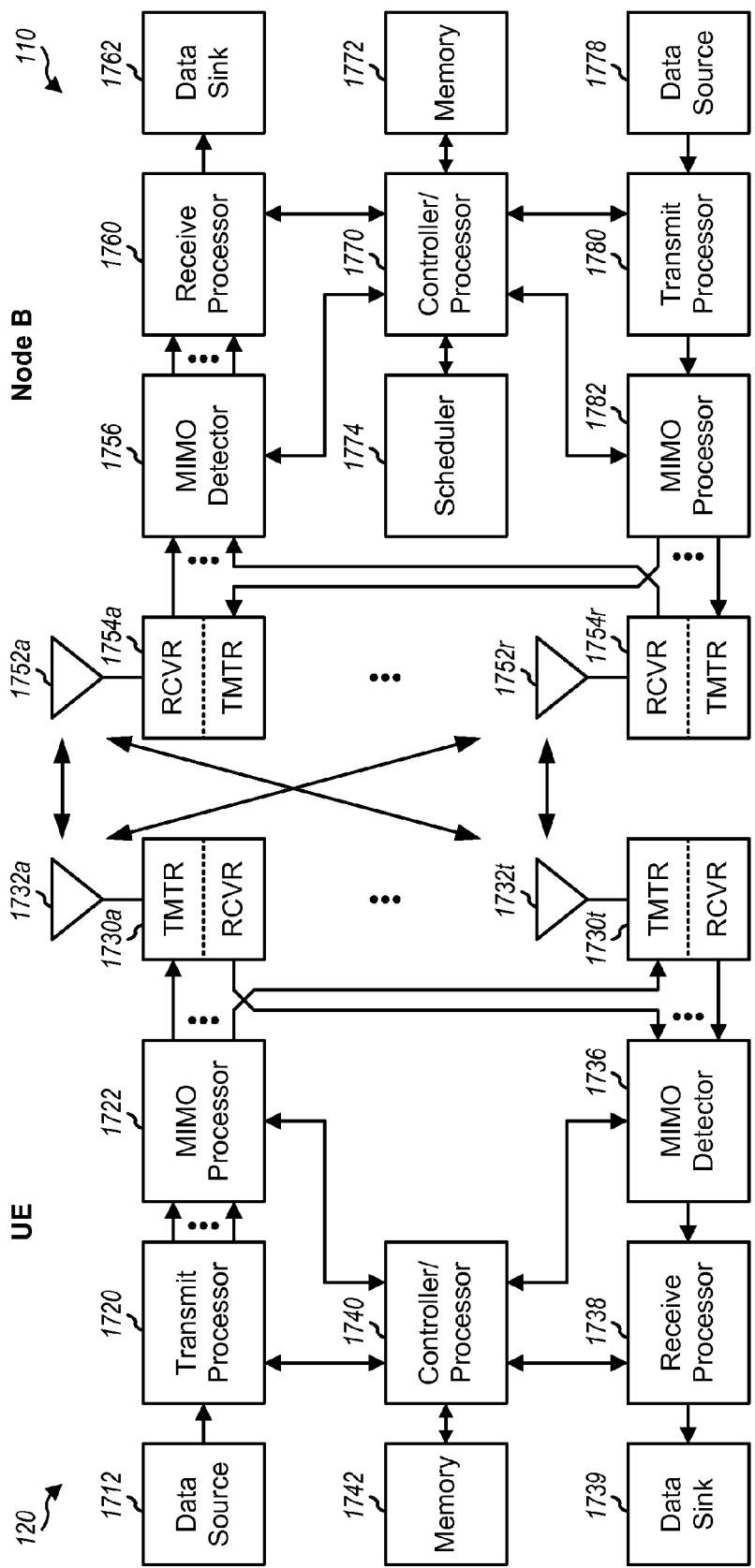
FIG. 17 shows a block diagram of a Node B and a UE.

FIG. 17 shows a block diagram of a design of a Node B 110 and a UE 120, which may be one of the Node Bs and one of the UEs in FIG. 1. In this design, UE 120 is equipped with T antennas 1732a through 1732t, and Node B 110 is equipped with R antennas 1752a through 1752r, where in general T≥1 and R≥1.

At UE 120, a transmit processor 1720 may receive traffic data from a data source 1712, process (e.g., encode and modulate) the traffic data, and provide data modulation symbols. Transmit processor 1720 may also receive control information (e.g., for CQI, ACK, etc.) from a controller/processor 1740, process the control information as described above, and provide control modulation symbols. Transmit processor 1720 may also generate reference symbols for a demodulation reference signal, a sounding reference signal, and/or other signals. Transmit processor 1720 may multiplex and/or puncture the traffic data with the control information at the coded data level or the modulation symbol level. Transmit processor 1720 may also multiplex the reference symbols with the traffic data and the control information. Transmit processor 1720 may implement transmit processor 500 in FIG. 5A, transmit processor 600 in FIG. 6A, or some other design. Transmit processor 1720 may perform all or part of process 700 in FIG. 7, process 900 in FIG. 9, process 1100 in FIG. 11, process 1300 in FIG. 13, process 1500 in FIG. 15, process 1600 in FIG. 16, and/or other processes for the techniques described herein.

A MIMO processor 1722 may process (e.g., precode) the symbols from transmit processor 1720 and provide T output symbol streams to T transmitter (TMTR) 1730a through 1730t. MIMO processor 1722 may be omitted if UE 120 is equipped with a single antenna. Each transmitter 1730 may include all or part of transmit chain 570 in FIG. 5B or transmit chain 670 in FIG. 6B. Each transmitter 1730 may process its output symbol stream to generate SC-FDMA symbols. Each transmitter 1730 may further condition (e.g., convert to analog, filter, amplify, and upconvert) its SC-FDMA symbols to generate an uplink signal. T uplink signals from transmitters 1730a through 1730t may be transmitted via T antennas 1732a through 1732t, respectively.

At Node B 110, antennas 1752a through 1752r may receive the uplink signals from UE 120 and/or other UEs. Each antenna 1752 may provide a received signal to a respective receiver (RCVR) 1754. Each receiver 1754 may condition (e.g., filter, amplify, downconvert, and digitize) its received signal to obtain samples and may further process the samples (e.g., for SC-FDMA) to obtain received symbols. A MIMO detector 1756 may perform MIMO detection on the received symbols from all R demodulators 1754a through 1754r and provide detected symbols. A receive processor 1760 may process (e.g., demodulate and decode) the detected symbols, provide decoded traffic data to a data sink 1762, and provide decoded control information to a controller/processor 1770.

In general, the processing by MIMO detector 1756 and receive processor 1760 is complementary to the processing by MIMO processor 1722 and transmit processor 1720, respectively, at UE 120.

Node B 110 may transmit traffic data and/or control information on the downlink to UE 120. Traffic data from a data source 1778 and/or control information from controller/processor 1770 may be processed by a transmit processor 1780 and further precoded by a MIMO processor 1782 to obtain R output symbol streams. R transmitters 1754a through 1754r may process the R output symbol streams to obtain R OFDMA symbol streams and may further condition the OFDMA symbol streams to obtain R downlink signals, which may be transmitted via R antennas 1752a through 1752r. At UE 120, the downlink signals from Node B 110 may be received by antennas 1732a through 1732t, conditioned and processed by receivers 1730a through 1730t, and further processed by a MIMO detector 1736 (if applicable) and a receive processor 1738 to recover the traffic data and control information sent to UE 120. Receive processor 1738 may provide decoded traffic data to a data sink 1739 and provide decoded control information to controller/processor 1740.

Controllers/processors 1740 and 1770 may direct the operation at UE 120 and Node B 110, respectively. Controller/processor 1740 may perform or direct process 700 in FIG. 7, process 900 in FIG. 9, process 1100 in FIG. 11, process 1300 in FIG. 13, process 1500 in FIG. 15, process 1600 in FIG. 16, and/or other processes for the techniques described herein. Memories 1742 and 1772 may store data and program codes for UE 120 and Node B 110, respectively. A scheduler 1774 may schedule UEs for data transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving an uplink signal from a UE;
   conditioning the uplink signal to obtain multiple single-carrier frequency division multiple access (SC-FDMA)

symbols based on multiplexed data, the multiplexed data comprising coded traffic data and coded control data multiplexed after encoding and prior to modulation, the SC-FDMA symbols conforming to a scaling of the coded traffic data and the coded control data based on a common gain applicable for both the coded traffic data and the coded control data; and decoding the multiplexed data to obtain traffic data and control information.

2. The method of claim 1, further comprising:
providing the traffic data to a data sink; and
providing the control information to a controller processor.

3. The method of claim 1 further comprising:
decoding the coded traffic data based on a first coding scheme; and
decoding the coded control data based on a second coding scheme.

4. The method of claim 3, further comprising:
determining the first coding scheme based on a modulation and coding scheme selected for the traffic data; and
determining the second coding scheme for the coded control data based on the modulation and coding scheme selected for the traffic data or a modulation and coding scheme selected for the control information.

5. The method of claim 3, wherein the coded traffic data conforms to rate matching by a UE following the encoding, the rate matching based on the coded control data.

6. The method of claim 3, wherein the coded traffic data conforms to rate matching performed by a UE following the encoding, the rate matching based on the coded control data and a sounding reference signal received with the traffic data and the control information.

7. The method of claim 1, wherein the receiving the uplink signal comprises:
receiving the control information in each of the multiple SC-FDMA symbols according to the multiplexing of the coded traffic data and the coded control data.

8. The method of claim 1, wherein the receiving the uplink signal comprises:
receiving at least one SC-FDMA symbol based on a demodulation reference signal, wherein the multiplexed data comprises SC-FDMA symbols based on control information multiplexed adjacent to the at least one SC-FDMA symbol based on the demodulation reference signal.

9. The method of claim 1, further comprising:
demodulating the SC-FDMA symbols to obtain the multiplexed data, the modulating being based on a common modulation scheme applicable for both the coded traffic data and the coded control data.

10. The method of claim 1, wherein the control information comprises channel quality indicator (CQI) information, or acknowledgement (ACK) information, or precoding matrix indicator (PMI) information, or rank information, or a combination thereof.

11. An apparatus for wireless communication, comprising:
at least one processor configured to:
receive an uplink signal from a UE;
condition the uplink signal to obtain multiple single-carrier frequency division multiple access (SC-FDMA) symbols based on multiplexed data, the multiplexed data comprising coded traffic data and coded control data multiplexed after encoding and prior to modulation, the SC-FDMA symbols conforming to a scaling of the coded traffic data and the coded control data based on a common gain applicable for both the coded traffic data and the coded control data; and
decode the multiplexed data to obtain traffic data and control information.

12. The apparatus of claim 11, wherein the at least one processor is further configured to:
provide the traffic data to a data sink; and
provide the control information to a controller processor.

13. The apparatus of claim 11 wherein the at least one processor is further configured to:
decode the coded traffic data based on a first coding scheme; and
decode the coded control data based on a second coding scheme.

14. The apparatus of claim 13, wherein the at least one processor is further configured to:
determine the first coding scheme based on a modulation and coding scheme selected for the traffic data; and
determine the second coding scheme for the coded control data based on the modulation and coding scheme selected for the traffic data or a modulation and coding scheme selected for the control information.

15. The apparatus of claim 13, wherein the coded traffic data conforms to rate matching by a UE following the encoding, the rate matching based on the coded control data.

16. The apparatus of claim 13, wherein the coded traffic data conforms to rate matching performed by a UE following the encoding, the rate matching based on the coded control data and a sounding reference signal received with the traffic data and the control information.

17. The apparatus of claim 11, wherein the at least one processor is further configured to:
receive the control information in each of the multiple SC-FDMA symbols according to the multiplexing of the coded traffic data and the coded control data.

18. The apparatus of claim 11, wherein the at least one processor is further configured to:
receive at least one SC-FDMA symbol based on a demodulation reference signal, wherein the multiplexed data comprises SC-FDMA symbols based on control information multiplexed adjacent to the at least one SC-FDMA symbol based on the demodulation reference signal.

19. The apparatus of claim 11, wherein the at least one processor is further configured to:
demodulate the SC-FDMA symbols to obtain the multiplexed data, the modulating being based on a common modulation scheme applicable for both the coded traffic data and the coded control data.

20. The apparatus of claim 11, wherein the control information comprises channel quality indicator (CQI) information, or acknowledgement (ACK) information, or precoding matrix indicator (PMI) information, or rank information, or a combination thereof.

21. An apparatus for wireless communication, comprising:
means for receiving an uplink signal from a UE;
means for conditioning the uplink signal to obtain multiple single-carrier frequency division multiple access (SC-FDMA) symbols based on multiplexed data, the multiplexed data comprising coded traffic data and coded control data multiplexed after encoding and prior to modulation, the SC-FDMA symbols conforming to a scaling of the coded traffic data and the coded control data based on a common gain applicable for both the coded traffic data and the coded control data; and
means for decoding the multiplexed data to obtain traffic data and control information.

22. The apparatus of claim 21 further comprising:
means for decoding the coded traffic data based on a first coding scheme; and
means for decoding the coded control data based on a second coding scheme.

23. The apparatus of claim 22, wherein the coded traffic data conforms to rate matching by a UE following the encoding, the rate matching based on the coded control data.

24. The apparatus of claim 21, wherein the receiving the uplink signal comprises:
means for receiving the control information in each of the multiple SC-FDMA symbols according to the multiplexing of the coded traffic data and the coded control data.

25. A non-transitory computer-readable medium comprising:
code for causing at least one computer to receive an uplink signal from a UE;
code for causing the at least one computer to condition the uplink signal to obtain multiple single-carrier frequency division multiple access (SC-FDMA) symbols based on multiplexed data, the multiplexed data comprising coded traffic data and coded control data multiplexed after encoding and prior to modulation, the SC-FDMA symbols conforming to a scaling of the coded traffic data and the coded control data based on a common gain applicable for both the coded traffic data and the coded control data; and
code for causing the at least one computer to decode the multiplexed data to obtain traffic data and control information.

26. A method for wireless communication, comprising:
receiving an uplink signal from a UE;
conditioning the uplink signal to obtain multiplexed data, the multiplexed data comprising coded traffic data and coded control data multiplexed after encoding, the coded traffic data conforming to rate matching performed at the UE on the coded traffic data before multiplexing, the rate matching based at least in part on the coded control data;
decoding the coded traffic data to obtain traffic data; and
decoding the coded control data to obtain control information.

27. The method of claim 26, further comprising:
providing the traffic data to a data sink; and
providing the control information to a controller processor.

28. The method of claim 26, wherein the traffic data and the control information are encoded based on different coding schemes.

29. The method of claim 28, wherein the coded traffic data is encoded based on a variable coding scheme, and wherein the coded control data is encoded based on a fixed coding scheme.

30. The method of claim 26, wherein the multiplexed data further comprises second coded control data and the rate matching performed on the coded traffic data is based further on the second coded control data.

31. The method of claim 30, wherein the multiplexed data is punctured by the second coded control data.

32. The method of claim 26, further comprising:
receiving a sounding reference signal with the multiplexed data,
wherein the rate matching is based further on the sounding reference.

33. An apparatus for wireless communication, comprising:
at least one processor configured to:
receive an uplink signal from a UE;
condition the uplink signal to obtain multiplexed data, the multiplexed data comprising coded traffic data and coded control data multiplexed after encoding, the coded traffic data conforming to rate matching performed at the UE on the coded traffic data before multiplexing, the rate matching based at least in part on the coded control data;
decode the coded traffic data to obtain traffic data; and
decode the coded control data to obtain control information.

34. The apparatus of claim 33, wherein the at least one processor is further configured to:
provide the traffic data to a data sink; and
provide the control information to a controller processor.

35. The apparatus of claim 33, wherein the traffic data and the control information are encoded based on different coding schemes.

36. The apparatus of claim 35, wherein the coded traffic data is encoded based on a variable coding scheme, and wherein the coded control data is encoded based on a fixed coding scheme.

37. The apparatus of claim 33, wherein the multiplexed data further comprises second coded control data and the rate matching performed on the coded traffic data is based further on the second coded control data.

38. The apparatus of claim 37, wherein the multiplexed data is punctured by the second coded control data.

39. The apparatus of claim 33, wherein the at least one processor is further configured to:
receiving a sounding reference signal with the multiplexed data,
wherein the rate matching is based further on the sounding reference.

40. An apparatus for wireless communication, comprising:
means for receiving an uplink signal from a UE;
means for conditioning the uplink signal to obtain multiplexed data, the multiplexed data comprising coded traffic data and coded control data multiplexed after encoding, the coded traffic data conforming to rate matching performed at the UE on the coded traffic data before multiplexing, the rate matching based at least in part on the coded control data;
means for decoding the coded traffic data to obtain traffic data; and
means for decoding the coded control data to obtain control information.

41. The apparatus of claim 40, wherein the traffic data and the control information are encoded based on different coding schemes.

42. The apparatus of claim 40, wherein the multiplexed data further comprises second coded control data and the rate matching performed on the coded traffic data is based further on the second coded control data.

43. The apparatus of claim 42, wherein the multiplexed data is punctured by the second coded control data.

44. A non-transitory computer-readable medium comprising:
code for causing at least one computer to receive an uplink signal from a UE;
code for causing the at least one computer to condition the uplink signal to obtain multiplexed data, the multiplexed data comprising coded traffic data and coded control data multiplexed after encoding, the coded traffic data conforming to rate matching performed at the UE on the coded traffic data before multiplexing, the rate matching based at least in part on the coded control data;
code for causing the at least one computer to decode the coded traffic data to obtain traffic data; and
code for causing the at least one computer to decode the coded control data to obtain control information.

45. A method for wireless communication, comprising:
receiving multiplexed data comprising traffic data multiplexed with first control information; and
receiving second control information, the second control information puncturing the multiplexed data, wherein the puncturing replaces a portion of the traffic data and a portion of the first control information with the second control information.

46. The method of claim 45, wherein the multiplexed data conforms to a multiplexing of coded traffic data and first coded control data after encoding the traffic data and the first control information, and wherein the multiplexed data further conforms to a puncturing of the multiplexed data with second coded control data after an encoding of the second control information.

47. The method of claim 46, wherein the traffic data and the first control information are encoded based on different coding schemes.

48. An apparatus for wireless communication, comprising:
at least one processor configured to:
receive multiplexed data comprising traffic data multiplexed with first control information; and
receive second control information, the second control information puncturing the multiplexed data, wherein the puncturing replaces a portion of the traffic data and a portion of the first control information with the second control information.

49. The apparatus of claim 48, wherein the multiplexed data conforms to a multiplexing of coded traffic data and first coded control data after encoding the traffic data and the first control information, and wherein the multiplexed data further conforms to a puncturing of the multiplexed data with second coded control data after an encoding of the second control information.

50. The apparatus of claim 49, wherein the traffic data and the first control information are encoded based on different coding schemes.

51. An apparatus for wireless communication, comprising:
means for receiving multiplexed data comprising traffic data multiplexed with first control information; and
means for receiving second control information, the second control information puncturing the multiplexed data, wherein the puncturing replaces a portion of the traffic data and a portion of the first control information with the second control information.

52. The apparatus of claim 51, wherein the multiplexed data conforms to a multiplexing of coded traffic data and the first coded control data after encoding the traffic data and the first control information, and wherein the multiplexed data further conforms to a puncturing of the multiplexed data with second coded control data after an encoding of the second control information.

53. The apparatus of claim 52, wherein the traffic data and the first control information are encoded based on different coding schemes.

54. A non-transitory computer-readable medium comprising:
code for causing at least one computer to receive multiplexed data comprising traffic data multiplexed with first control information; and
code for causing the at least one computer to receive second control information, the second control information puncturing the multiplexed data, wherein the puncturing replaces a portion of the traffic data and a portion of the first control information with the second control information.

55. A method for wireless communication, comprising:
multiplexing traffic data and first control information to obtain multiplexed data, the multiplexing being performed based on a type of the first control information; and
puncturing the multiplexed data with second control information, the puncturing being performed after multiplexing and based on a type of the second control information.

56. The method of claim 55, further comprising:
encoding the traffic data to obtain coded traffic data;
encoding the first control information to obtain first coded control data; and
encoding the second control information to obtain second coded control data, wherein the multiplexing comprises multiplexing the coded traffic data and the first coded control data to obtain the multiplexed data, and wherein the puncturing comprises puncturing the multiplexed data with the second coded control data.

57. The method of claim 56, wherein the traffic data and the first control information are encoded based on different coding schemes.

58. The method of claim 57, further comprising:
determining a first coding scheme based on a modulation and coding scheme selected for the traffic data; and
determining a second coding scheme for the first control information based on the modulation and coding scheme for the traffic data or a modulation and coding scheme for the first control information.

59. The method of claim 57, further comprising:
performing rate matching on the coded traffic data based on the first coded control data.

60. The method of claim 59, wherein the rate matching is further based on the second coded control data.

61. The method of claim 55, further comprising:
scaling the traffic data, the first control information, and the second control information based on a common gain applicable for the traffic data, the first control information, and the second control information.

62. The method of claim 55, wherein the puncturing replaces a portion of the multiplexed data with the second control information.

63. An apparatus for wireless communication, comprising:
at least one processor configured to:
multiplex traffic data and first control information to obtain multiplexed data, the multiplexing being performed based on a type of the first control information; and
puncture the multiplexed data with second control information, the puncturing being performed after multiplexing and based on a type of the second control information.

64. The apparatus of claim 63, wherein the at least one processor is further configured to:
encode the traffic data to obtain coded traffic data;
encode the first control information to obtain first coded control data; and
encode the second control information to obtain second coded control data, wherein the multiplexing comprises multiplexing the coded traffic data and the first coded control data to obtain the multiplexed data, and wherein the puncturing comprises puncturing the multiplexed data with the second coded control data.

65. The apparatus of claim 64, wherein the traffic data and the first control information are encoded based on different coding schemes.

66. The apparatus of claim 65, wherein the at least one processor is further configured to:
    determine a first coding scheme based on a modulation and coding scheme selected for the traffic data; and
    determine a second coding scheme for the first control information based on the modulation and coding scheme for the traffic data or a modulation and coding scheme for the first control information.

67. The apparatus of claim 65, wherein the at least one processor is further configured to:
    perform rate matching on the coded traffic data based on the first coded control data.

68. The apparatus of claim 67, wherein the rate matching is further based on the second coded control data.

69. The apparatus of claim 63, wherein the at least one processor is further configured to:
    scale the traffic data, the first control information, and the second control information based on a common gain applicable for the traffic data, the first control information, and the second control information.

70. The apparatus of claim 63, wherein the puncturing replaces a portion of the multiplexed data with the second control information.

71. An apparatus for wireless communication, comprising:
    means for multiplexing traffic data and first control information to obtain multiplexed data, the multiplexing being performed based on a type of the first control information; and
    means for puncturing the multiplexed data with second control information, the puncturing being performed after multiplexing and based on a type of the second control information.

72. The apparatus of claim 71, further comprising:
    means for encoding the traffic data to obtain coded traffic data;
    means for encoding the first control information to obtain first coded control data; and
    means for encoding the second control information to obtain second coded control data, wherein the multiplexing comprises multiplexing the coded traffic data and the first coded control data to obtain the multiplexed data, and wherein the puncturing comprises puncturing the multiplexed data with the second coded control data.

73. The apparatus of claim 72, wherein the traffic data and the first control information are encoded based on different coding schemes.

74. The apparatus of claim 73, further comprising:
    means for performing rate matching on the coded traffic data based on the first coded control data.

75. The apparatus of claim 71, further comprising:
    means for scaling the traffic data, the first control information, and the second control information based on a common gain applicable for the traffic data, the first control information, and the second control information.

76. The apparatus of claim 71, wherein the puncturing replaces a portion of the multiplexed data with the second control information.

77. A non-transitory computer-readable medium comprising:
    code configured to cause at least one computer to multiplex traffic data and first control information to obtain multiplexed data, the multiplexing being performed based on a type of the first control information; and
    code configured to cause at least one computer to puncture the multiplexed data with second control information, the puncturing being performed after multiplexing and based on a type of the second control information.

78. A method for wireless communication, comprising:
    encoding traffic data based on a first coding scheme to obtain coded traffic data;
    encoding control information based on a second coding scheme to obtain coded control data, wherein the second coding scheme is different from the first coding scheme;
    multiplexing the coded traffic data and the coded control data after encoding and prior to modulation to obtain multiplexed data; and
    generating multiple single-carrier frequency division multiple access (SC-FDMA) symbols based on the multiplexed data after scaling.

79. The method of claim 78, further comprising:
    determining the first coding scheme based on a modulation and coding scheme selected for the traffic data; and
    determining the second coding scheme for the control information based on the modulation and coding scheme for the traffic data or a modulation and coding scheme for the control information.

80. The method of claim 78, further comprising:
    performing rate matching on the coded traffic data based on the coded control data.

81. The method of claim 78, further comprising:
    performing rate matching on the coded traffic data based on the coded control data and a sounding reference signal sent with the traffic data and the control information.

82. The method of claim 78, wherein the multiplexing comprises multiplexing the traffic data and the control information to send the control information in each of the multiple SC-FDMA symbols.

83. The method of claim 78, further comprising:
    generating at least one SC-FDMA symbol for a demodulation reference signal, and wherein the multiplexing comprises multiplexing the control information to SC-FDMA symbols adjacent to the at least one SC-FDMA symbol for the demodulation reference signal.

84. The method of claim 78, further comprising:
    modulating the multiplexed data to obtain modulation symbols, the modulating being based on a common modulation scheme applicable for both the traffic and the control information.

85. The method of claim 78, further comprising:
    scaling the traffic data and the control information based on a common gain applicable for both the traffic data and the control information.

86. The method of claim 85, further comprising:
    determining the common gain applicable for both the traffic data and the control information based on transmit power for the multiplexed data.

87. The method of claim 78, wherein the control information comprises channel quality indicator (CQI) information, or acknowledgement (ACK) information, or precoding matrix indicator (PMI) information, or rank information, or a combination thereof.

88. An apparatus for wireless communication, comprising:
    at least one processor configured to:
    encode traffic data based on a first coding scheme to obtain coded traffic data;

encode control information based on a second coding scheme to obtain coded control data, wherein the second coding scheme is different from the first coding scheme;
multiplex the coded traffic data and the coded control data after encoding and prior to modulation to obtain multiplexed data; and
generate multiple single-carrier frequency division multiple access (SC-FDMA) symbols based on the multiplexed data after scaling.

89. The apparatus of claim 88, wherein the at least one processor is further configured to:
determine the first coding scheme based on a modulation and coding scheme selected for the traffic data; and
determine the second coding scheme for the control information based on the modulation and coding scheme for the traffic data or a modulation and coding scheme for the control information.

90. The apparatus of claim 88, wherein the at least one processor is further configured to:
perform rate matching on the coded traffic data based on the coded control data.

91. The apparatus of claim 88, wherein the at least one processor is further configured to:
perform rate matching on the coded traffic data based on the coded control data and a sounding reference signal sent with the traffic data and the control information.

92. The apparatus of claim 88, wherein the multiplexing comprises multiplexing the traffic data and the control information to send the control information in each of the multiple SC-FDMA symbols.

93. The apparatus of claim 88, wherein the at least one processor is further configured to:
generate at least one SC-FDMA symbol for a demodulation reference signal, and wherein the multiplexing comprises multiplexing the control information to SC-FDMA symbols adjacent to the at least one SC-FDMA symbol for the demodulation reference signal.

94. The apparatus of claim 88, wherein the at least one processor is further configured to:
modulate the multiplexed data to obtain modulation symbols, the modulating being based on a common modulation scheme applicable for both the traffic and the control information.

95. The apparatus of claim 88, wherein the at least one processor is further configured to:
scale the traffic data and the control information based on a common gain applicable for both the traffic data and the control information.

96. The apparatus of claim 95, wherein the at least one processor is further configured to:
determine the common gain applicable for both the traffic data and the control information based on transmit power for the multiplexed data.

97. The apparatus of claim 88, wherein the control information comprises channel quality indicator (CQI) information, or acknowledgement (ACK) information, or precoding matrix indicator (PMI) information, or rank information, or a combination thereof.

98. An apparatus for wireless communication, comprising:
means for encoding traffic data based on a first coding scheme to obtain coded traffic data;
means for encoding control information based on a second coding scheme to obtain coded control data, wherein the second coding scheme is different from the first coding scheme;
means for multiplexing the coded traffic data and the coded control data after encoding and prior to modulation to obtain multiplexed data; and
means for generating multiple single-carrier frequency division multiple access (SC-FDMA) symbols based on the multiplexed data after scaling.

99. The apparatus of claim 98, further comprising:
means for performing rate matching on the coded traffic data based on the coded control data.

100. The apparatus of claim 98, further comprising:
means for performing rate matching on the coded traffic data based on the coded control data and a sounding reference signal sent with the traffic data and the control information.

101. The apparatus of claim 98, further comprising:
means for scaling the traffic data and the control information based on a common gain applicable for both the traffic data and the control information.

102. A non-transitory computer-readable medium, comprising:
code configured to cause at least one computer to encode traffic data based on a first coding scheme to obtain coded traffic data;
code configured to cause the at least one computer to encode control information based on a second coding scheme to obtain coded control data, wherein the second coding scheme is different from the first coding scheme;
code configured to cause the at least one computer to multiplex the coded traffic data and the coded control data after encoding and prior to modulation to obtain multiplexed data; and
code configured to cause the at least one computer to generate multiple single-carrier frequency division multiple access (SC-FDMA) symbols based on the multiplexed data after scaling.

* * * * *